United States Patent
Harada

(10) Patent No.: US 10,025,474 B2
(45) Date of Patent: Jul. 17, 2018

(54) INFORMATION PROCESSING APPARATUS, SYSTEM, AND METHOD, AND RECORDING MEDIUM

(71) Applicant: Kohtaroh Harada, Kanagawa (JP)

(72) Inventor: Kohtaroh Harada, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 249 days.

(21) Appl. No.: 15/159,939

(22) Filed: May 20, 2016

(65) Prior Publication Data
US 2016/0357734 A1 Dec. 8, 2016

(30) Foreign Application Priority Data

Jun. 3, 2015 (JP) .................................. 2015-112938
Apr. 1, 2016 (JP) .................................. 2016-073990

(51) Int. Cl.
*G06F 17/00* (2006.01)
*G06F 3/0484* (2013.01)
(Continued)

(52) U.S. Cl.
CPC .......... *G06F 3/04842* (2013.01); *G06F 9/454* (2018.02); *G06F 17/289* (2013.01)

(58) Field of Classification Search
CPC .................................................. G06F 17/289
See application file for complete search history.

(56) References Cited

U.S. PATENT DOCUMENTS 7,130,792 B2 * 10/2006 Tokieda ................ G06F 17/289
704/7
9,696,881 B2 * 7/2017 Pornprasitsakul .... G06F 3/0484
(Continued)

FOREIGN PATENT DOCUMENTS

JP 2002-279219 9/2002
JP 2003-006455 1/2003

OTHER PUBLICATIONS

Wang et al., "Locating Need-to-Translate Constant Strings for Software Internationalization" ICSE'09, May 16-24, 2009, Vancouver, Canada, p. 353-363.*

(Continued)

*Primary Examiner* — Amelia Tapp
(74) *Attorney, Agent, or Firm* — Cooper & Dunham LLP

(57) ABSTRACT

An information processing apparatus includes a memory, a receiver, and circuitry. The memory stores, for each one of a plurality of character strings, display number information indicating a total number of times the character string has been displayed at a user terminal, the user terminal being operated by a user. The receiver receives, from the user terminal, information on one of the plurality of character strings that is displayed at the user terminal. The circuitry updates the display number information for the displayed character string, based on the information on the displayed character string that is received by the receiver, determines whether the displayed character string is to be translated, based on the updated display number information, and sends a request to manually translate the displayed character string, based on determination indicating that the displayed character string is to be translated.

10 Claims, 19 Drawing Sheets

| TERM ID | LANGUAGE | TRANSLATED CHARACTER STRING | E-MAIL ADDRESS OF PERSON WHO REGISTERED TERM | STATUS | NUMBER OF TIMES UI IS DISPLAYED |
|---|---|---|---|---|---|
| 000001 | en | Pay slip | oooo@oooo.com | ORIGINAL | - |
| 000001 | ja | 有料スリップ | - | MACHINE TRANSLATION | 29 |
| 000001 | es | hoja de paga | - | MACHINE TRANSLATION | 10 |
| 000001 | fr | fiche de pale | - | MACHINE TRANSLATION | 1 |
| 000001 | it | busta paga | - | MACHINE TRANSLATION | 1 |
| 000001 | zh-cn | 工资单 | - | MACHINE TRANSLATION | 4 |
| 000001 | ... | ... | ... | ... | ... |
| 000002 | en | Sales record | xxxx@xxxx.com | ORIGINAL | - |
| 000002 | ja | 売上記録 | - | MACHINE TRANSLATION | 29 |
| 000002 | es | récord de ventas | - | MACHINE TRANSLATION | 10 |
| 000002 | fr | Record de ventas | - | MACHINE TRANSLATION | 1 |
| 000002 | it | Record di vendi te | - | MACHINE TRANSLATION | 1 |
| 000002 | zh-cn | 销售记录 | - | MACHINE TRANSLATION | 4 |
| 000002 | ... | ... | ... | ... | ... |

(51) Int. Cl.
    *G06F 17/28*    (2006.01)
    *G06F 9/451*    (2018.01)

(56) References Cited

U.S. PATENT DOCUMENTS

2011/0313755 A1* 12/2011 Oh .................. G06F 17/289
    704/3
2014/0006004 A1* 1/2014 Gundepuneni ..... G06F 17/2264
    704/2

OTHER PUBLICATIONS

Frederking et al., "An MAT Tool and Its Effectiveness" HLT '93 Proceedings of the workshop on Human Language Technology, pp. 196-201.*

Morita et al., "Collaborative Translation by Monolinguals with Machine Translators" IUI'09, Feb. 8-11, 2009, Sanibel Island, Florida, USA, p. 361-365.*

* cited by examiner

FIG. 3

| TERM ID | LANGUAGE | TRANSLATED CHARACTER STRING | STATUS | NUMBER OF TIMES UI IS DISPLAYED |
|---|---|---|---|---|
| 000001 | en | For forms | ORIGINAL | – |
| 000001 | ja | フォームの場合 | MACHINE TRANSLATION | 29 |
| 000001 | es | Para las formas | MACHINE TRANSLATION | 10 |
| 000001 | fr | Pour les forms | MACHINE TRANSLATION | 1 |
| 000001 | it | Par le forme | MACHINE TRANSLATION | 1 |
| 000001 | zh-cn | 表单 | MACHINE TRANSLATION | 4 |
| 000001 | ... | ... | ... | ... |
| 000002 | en | For business card | ORIGINAL | – |
| 000002 | ja | 名刺のための | MACHINE TRANSLATION | 29 |
| 000002 | es | Para la tarjeta de visita | MACHINE TRANSLATION | 10 |
| 000002 | fr | Pour la carte d'affaires | MACHINE TRANSLATION | 1 |
| 000002 | it | Per biglietto da visita | MACHINE TRANSLATION | 1 |
| 000002 | zh-cn | 名片 | MACHINE TRANSLATION | 4 |
| 000002 | ... | ... | ... | ... |

FIG. 4

| TERM ID | LANGUAGE | TRANSLATED CHARACTER STRING | STATUS | NUMBER OF TIMES UI IS DISPLAYED |
|---|---|---|---|---|
| 000001 | en | For forms | ORIGINAL | — |
| 000001 | ja | 帳票用 | MANUAL TRANSLATION | — |
| 000001 | es | Para las formas | MACHINE TRANSLATION | 10 |
| 000001 | fr | Pour les forms | MACHINE TRANSLATION | 1 |
| 000001 | it | Par le forme | MACHINE TRANSLATION | 1 |
| 000001 | zh-cn | 表单 | MACHINE TRANSLATION | 4 |
| 000001 | ... | ... | ... | ... |
| 000002 | en | For business card | ORIGINAL | — |
| 000002 | ja | 名刺用 | MANUAL TRANSLATION | — |
| 000002 | es | Para la tarjeta de visita | MACHINE TRANSLATION | 10 |
| 000002 | fr | Pour la carte d'affaires | MACHINE TRANSLATION | 1 |
| 000002 | it | Per biglietto da visita | MACHINE TRANSLATION | 1 |
| 000002 | zh-cn | 名片 | MACHINE TRANSLATION | 4 |
| 000002 | ... | ... | ... | ... |

FIG. 7

| TERM ID | LANGUAGE | TRANSLATED CHARACTER STRING | STATUS |
|---|---|---|---|
| 000001 | en | For forms | ORIGINAL |
| 000001 | ja | フォームの場合 | MACHINE TRANSLATION |
| 000001 | es | Para las formas | MACHINE TRANSLATION |
| 000001 | fr | Pour les forms | MACHINE TRANSLATION |
| 000001 | it | Par le forme | MACHINE TRANSLATION |
| 000001 | zh-cn | 表单 | MACHINE TRANSLATION |
| 000001 | ... | ... | ... |
| 000002 | en | For business card | ORIGINAL |
| 000002 | ja | 名刺のための | MACHINE TRANSLATION |
| 000002 | es | Para la tarjeta de visita | MACHINE TRANSLATION |
| 000002 | fr | Pour la carte d'affaires | MACHINE TRANSLATION |
| 000002 | it | Per biglietto da visita | MACHINE TRANSLATION |
| 000002 | zh-cn | 名片 | MACHINE TRANSLATION |
| 000002 | ... | ... | ... |

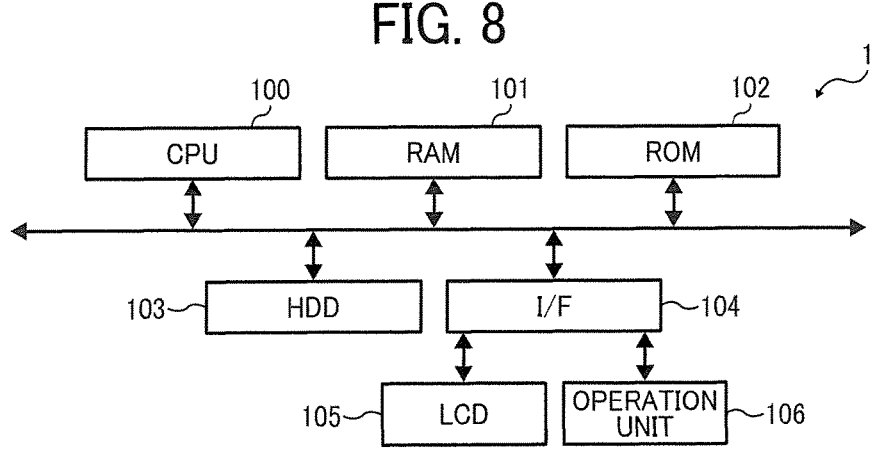

FIG. 8

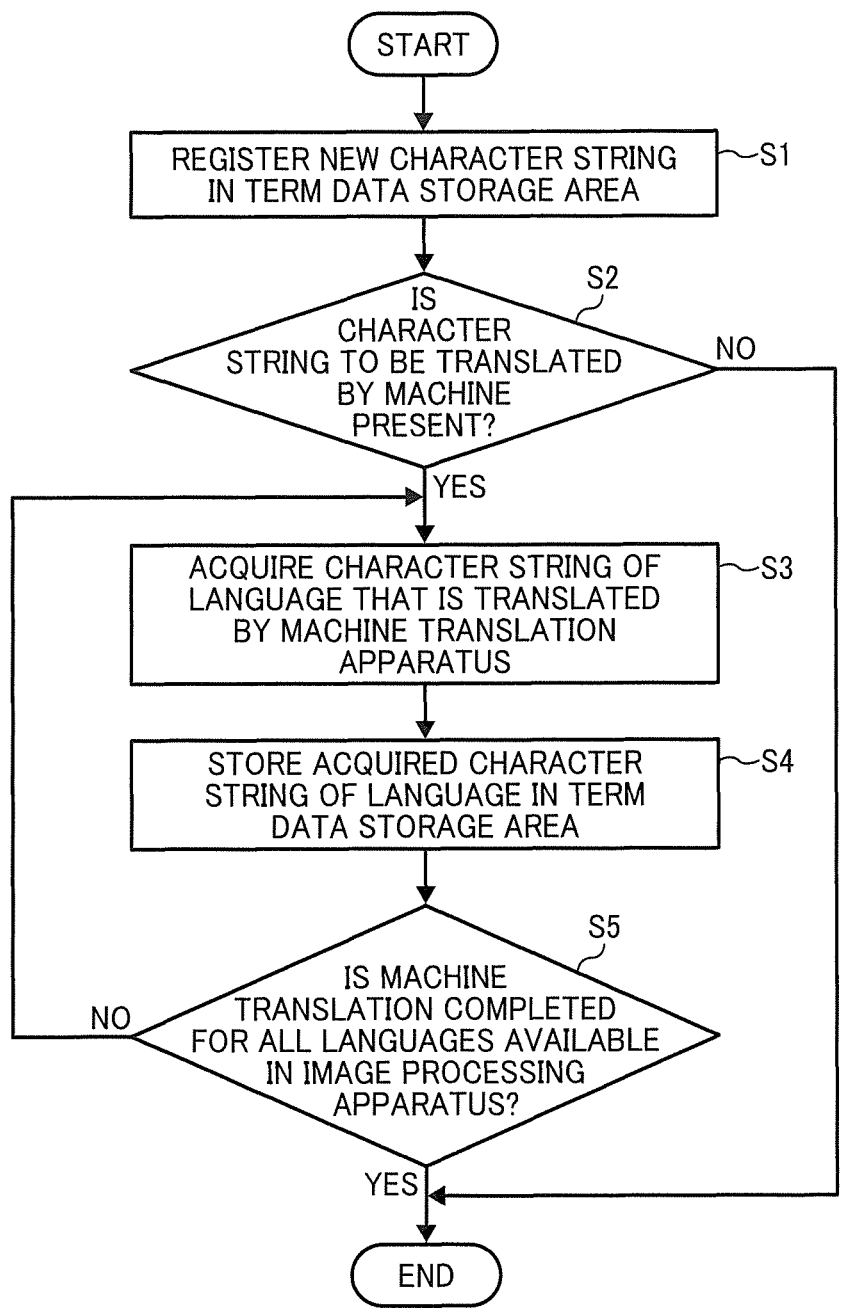

FIG. 16

| REQUEST ID | TERM ID | LANGUAGE | IDENTIFIER |
|---|---|---|---|
| 000001 | 000001 | ja | yp05wiYN0DFjLIaQkzuebsmox9KcqLRh?key=0FcIA_2AYrLAMeMY28tULHZXKzxflemB |
| 000002 | 000002 | ja | eBc5gOKM11XhJtpekd3aNo3heYmZ8qtO?key=Y0H8KSMrZ2JwLbjkF0iq6ZMfA06jUt6a |

FIG. 17

TRANSLATION REQUEST

ENTER TRANSLATION OF CHARACTER STRING AND CLICK REGISTRATION KEY.

SOURCE:   LANGUAGE:   MACHINE TRANSLATION:   TRANSLATION:
For forms   JAPANESE   フォームの場合   帳票用

REGISTRATION   CANCEL

| LANGUAGE | E-MAIL ADDRESS OF TRANSLATOR |
|----------|------------------------------|
| en | aaaa@aaaa.com |
| ja | bbbb@bbbb.com |
| es | cccc@cccc.com |
| fr | dddd@dddd.com |
| it | eeee@eeee.com |
| zh-cn | ffff@ffff.com |
| ... | ... |

FIG. 22

| TERM ID | LANGUAGE | TRANSLATED CHARACTER STRING | E-MAIL ADDRESS OF PERSON WHO REGISTERED TERM | STATUS | NUMBER OF TIMES UI IS DISPLAYED |
|---|---|---|---|---|---|
| 000001 | en | Pay slip | oooo@oooo.com | ORIGINAL | - |
| 000001 | ja | 有料スリップ | - | MACHINE TRANSLATION | 29 |
| 000001 | es | hoja de paga | - | MACHINE TRANSLATION | 10 |
| 000001 | fr | fiche de pale | - | MACHINE TRANSLATION | 1 |
| 000001 | it | busta paga | - | MACHINE TRANSLATION | 1 |
| 000001 | zh-cn | 工资单 | - | MACHINE TRANSLATION | 4 |
| 000001 | ... | ... | ... | ... | ... |
| 000002 | en | Sales record | xxxx@xxxx.com | ORIGINAL | - |
| 000002 | ja | 売上記録 | - | MACHINE TRANSLATION | 29 |
| 000002 | es | récord de vantas | - | MACHINE TRANSLATION | 10 |
| 000002 | fr | Record de ventas | - | MACHINE TRANSLATION | 1 |
| 000002 | it | Record di vendi te | - | MACHINE TRANSLATION | 1 |
| 000002 | zh-cn | 销售记录 | - | MACHINE TRANSLATION | 4 |
| 000002 | ... | ... | ... | ... | ... |

INFORMATION PROCESSING APPARATUS, SYSTEM, AND METHOD, AND RECORDING MEDIUM

CROSS-REFERENCE TO RELATED APPLICATIONS

This patent application is based on and claims priority pursuant to 35 U.S.C. § 119(a) to Japanese Patent Applications No. 2015-112938, filed on Jun. 3, 2015, and No. 2016-073990, filed on Apr. 1, 2016 in the Japan Patent Office, the entire disclosures of which are hereby incorporated by reference herein.

BACKGROUND

Technical Field

The present invention relates to an information processing apparatus, a recording medium, an information processing system, and a method for processing information.

Description of the Related Art

To allow more users the world over to use computer-based contents or applications, it is helpful to translate character strings used in those contents or applications into as many languages as possible in advance so that users are able to use the contents or applications in a language that he/she can understand without hindrance. However, the translation of a new character string is occasionally required by updates or customization of the contents or applications, and in these cases it is sometimes difficult to ensure enough time for the translation. Accordingly, the character strings used in contents or applications are sometimes machine-translated, which is less than optimal.

SUMMARY

An information processing apparatus includes a memory, a receiver, and circuitry. The memory stores, for each one of a plurality of character strings, display number information indicating a total number of times the character string has been displayed at a user terminal, the user terminal being operated by a user. The receiver receives, from the user terminal, information on one of the plurality of character strings that is displayed at the user terminal. The circuitry updates the display number information for the displayed character string, based on the information on the displayed character string that is received by the receiver, determines whether the displayed character string is to be translated, based on the updated display number information, and sends a request to manually translate the displayed character string, based on determination indicating that the displayed character string is to be translated.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a view illustrating an example of term data stored in a term data storage area of the image processing apparatus of FIG. 2;

FIG. 4 is a view illustrating another example of term data stored in the term data storage area of the image processing apparatus of FIG. 2;

FIG. 7 is a view illustrating an example of term data stored in a term data storage area of the client terminal of FIG. 6;

FIG. 8 is a block diagram illustrating an exemplary hardware configuration of the client terminal of FIG. 6;

FIG. 9 is a flowchart illustrating an operation of registering a new character string in the term data storage area of the image processing apparatus of FIG. 2;

FIG. 16 is a view illustrating an example of a table that contains a translation request in association with an identifier according to an embodiment of the present invention;

FIG. 17 is a view illustrating an example of a web form for registering a translated term;

FIG. 22 is a view illustrating an example of term data stored in a term data storage area of the content providing apparatus of FIG. 19.

Figure 1:
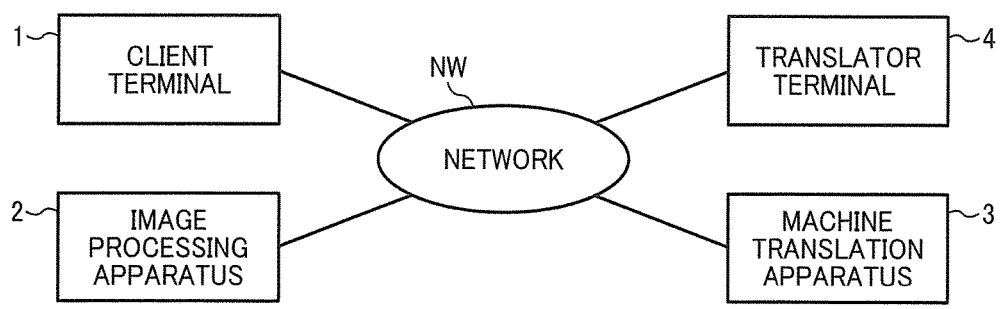
FIG. 1 is a schematic view illustrating an exemplary configuration of an information processing system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

First, a description is given of an overview of an information processing system according to an exemplary embodiment of the present invention with reference to FIG. 1. FIG. 1 is a schematic view illustrating an exemplary configuration of an information processing system according to an embodiment of the present invention.

As illustrated in FIG. 1, the information processing system according to the embodiment of the present invention includes a client terminal 1 and an information processing apparatus. Examples of the information processing apparatus include an image processing apparatus 2 of FIG. 1 and a content providing apparatus 5 of FIG. 10.

The information processing apparatus is connected to a first terminal and a second terminal. The information processing apparatus includes an acquisition unit, a memory control unit, a determination unit, and a translation request unit. The first terminal corresponds to the client terminal 1 of FIG. 1 or FIG. 18. The second terminal corresponds to a translator terminal 4 of FIG. 1 or FIG. 18. The acquisition unit acquires, from the first terminal, information on a character string displayed by the first terminal. The acquisition unit corresponds to a user interface (UI) unit 211 of FIG. 2 or FIG. 19. The memory control unit causes a memory to store the number of times each character string is displayed based on the information on the character string acquired by the acquisition unit. The memory control unit corresponds to a memory control unit 215 of FIG. 2 or FIG. 19. The memory corresponds to a memory 22 of FIG. 2 or FIG. 19. The determination unit determines the character string for which the translation is to be requested based on the number of times the character string is displayed that is stored in the memory. The determination unit corresponds to a determination unit 216 of FIG. 2 or FIG. 19. The translation request unit requests the second terminal to translate the character string, which is determined by the determination unit as the character string for which the translation is to be requested. The translation request unit corresponds to a manual translation request unit of FIG. 2 or FIG. 19.

The information processing system according to an embodiment of the present invention determines, based on information on a character string referred to by a user at the client terminal 1, that the character string referred to by the user more than a threshold number of times is to be manually translated. The information processing system sends, to the translator terminal 4, a request to instruct a translator who uses the translator terminal to manually translate such character string. Thus, the character string that is referred to by the user more frequently is manually translated over other character strings. Hereinafter, a description is given in detail of the information processing system according to embodiments of the present invention with reference to drawings.

Exemplary Configuration of Information Processing System

First, a description is given of an exemplary configuration of the information processing system with reference to FIG. 1. FIG. 1 is a schematic view illustrating a configuration of the information processing system according to this embodiment.

The information processing system according to this embodiment includes the client terminal 1, the image processing apparatus 2, a machine translation apparatus 3, and the translator terminal 4. The client terminal 1, the image processing apparatus 2, the machine translation apparatus 3, and the translator terminal 4 are connected to one another via a network NW. The network NW may support any communication modes, regardless of wired or wireless.

The connection among the client terminal 1, the image processing apparatus 2, the machine translation apparatus 3, and the translator terminal 4 via the network NW may not be limited to a parallel connection. For example, the client terminal 1 and the image processing apparatus 2 may be connected to each other via a universal serial bus (USB) or Bluetooth (registered trademark), while the image processing apparatus 2, the machine translation apparatus 3, and the translator terminal 4 are connected to one another via a local area network (LAN).

The client terminal 1 generates print data and sends the generated print data to the image processing apparatus 2. The client terminal 1 is implemented by, for example, an apparatus such as a personal computer. The image processing apparatus 2 applies the print data received from the client terminal 1 with various image processing. The image processing apparatus 2 is implemented by, for example, an apparatus such as a printer. The machine translation apparatus 3 performs machine translation in different languages in response to receiving a request for machine translation from the image processing apparatus 2. The translator terminal 4 requests a translator who uses the translator terminal 4 to manually translate a character string in response to receiving a request for manual translation from the image processing apparatus 2 to obtain a translation result.

The image processing apparatus 2 according to this embodiment stores character strings of different languages. The client terminal 1 acquires the character strings of different languages, from the image processing apparatus 2, and selects the character string of a specific language supported by the client terminal 1 from among the acquired character strings. The client terminal 1 requests the image processing apparatus 2 to perform processing including printing. Accordingly, the client terminal 1 is able to select the character string of the specific language supported by the client terminal 1 from among the character strings of different languages acquired from the image processing apparatus 2 to request the image processing apparatus 2 to perform processing using the selected character string.

When a new character string is registered in the image processing apparatus 2, the image processing apparatus 2 requests the machine translation apparatus 3 to machine-translate the new character string to acquire the machine-translated character strings of different languages from the machine translation apparatus 3. Thus, in response to the registration of the new character string, the image processing apparatus 2 is able to store the character strings of different languages that are machine-translated from the new character string.

Further, the image processing apparatus 2 acquires, from the client terminal 1, information on which the image processing apparatus 2 can identify the character string of a specific language that is referred to by the client terminal 1. Based on the information acquired from the client terminal 1, the image processing apparatus 2 determines whether the client terminal 1 refers to any character string of a specific language more than a predetermined threshold number of times. When the image processing apparatus specifies any character string of the specific language that is referred to by the client terminal 1 more than the predetermined threshold number of times, the image processing apparatus 2 determines that the manual translation is to be performed on the specified character string. In addition, the image processing apparatus 2 requests the translator terminal 4 to instruct the translator to manually translate the specified character string. Then, the image processing apparatus 2 acquires, from the translator terminal 4, the character string of the language that is manually translated by the translator. Thus, the image processing apparatus 2 according to this embodiment acquires the information on the character string of the specific language referred to by the client terminal 1, and, based on the acquired information, determines which character string is referred to by the client terminal 1 more than the threshold number of times. With the configuration as described above, the image processing apparatus 2 according to this embodiment is able to acquire the manual translation of only the character string that is determined to be manually translated from among the machine-translated character strings of different languages stored in the image processing apparatus 2.

Exemplary Configuration of Image Processing Apparatus

Figure 2:
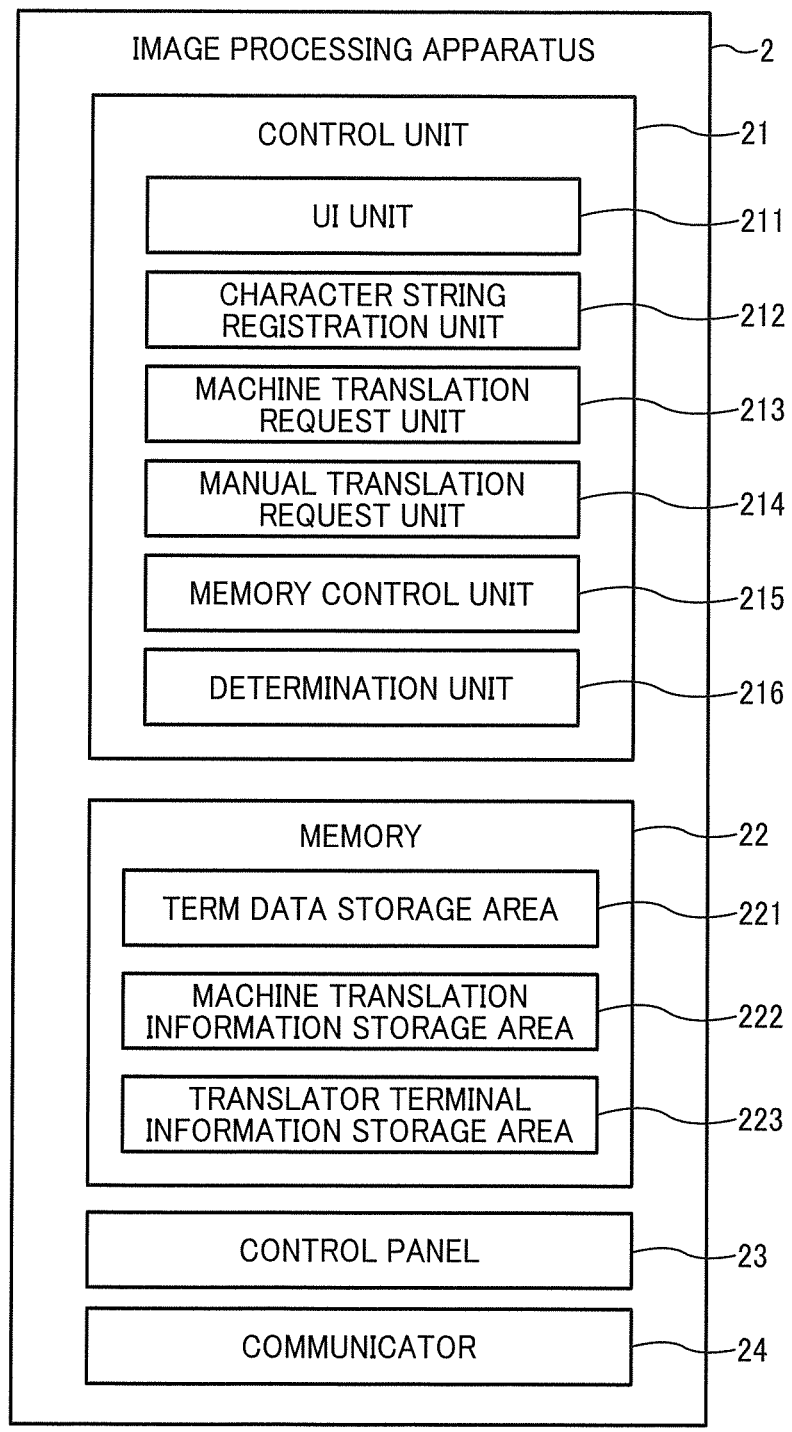
FIG. 2 is a block diagram illustrating an exemplary configuration of an image processing apparatus included in the information processing system of FIG. 1.

Hereinafter, a description is given of an exemplary configuration of the image processing apparatus 2 with reference to FIG. 2. As illustrated in FIG. 2, the image processing apparatus 2 according to this embodiment includes a control unit 21, the memory 22, a control panel 23, and a communicator 24. The control unit 21 controls entire operation of the image processing apparatus 2. The memory 22 stores various information. The control panel 23 displays various information or allows a user to input various instructions. The communicator 24 exchanges information with another apparatus via the network NW.

The control unit 21 includes the UI unit 211, a character string registration unit 212, a machine translation request unit 213, the manual translation request unit 214, the memory control unit 215, and the determination unit 216.

The memory 22 includes a term data storage area 221, a machine translation apparatus information storage area 222, and a translator terminal information storage area 223.

The term data storage area 221 stores the character strings of different languages on a language-by-language basis. FIGS. 3 and 4 each illustrates an example of the character strings of different languages stored in the term data storage area 221. Specifically, FIG. 3 illustrates an example where the character strings of different languages that are machine-translated by the machine translation apparatus 3 are stored. By contrast, FIG. 4 illustrates an example where the character string of a specific language that is manually translated by a translator as instructed by the translator terminal 4 is stored. The term data storage area 221 stores each character string in association with a unique term ID. Each character string is translated into different languages supported by the image processing apparatus 2. The term data storage area 221 stores the translated character strings, each being associated with a status of the character string and a number of times the UI of the character string is displayed (referred to as "the number of times of UI display", hereinafter).

The status of character string indicates a status of translation of the character string. Specifically, the status indicates whether the character string is original, machine-translated, or manually translated. The character string associated with the status of "ORIGINAL" is a character string that is registered in the term data storage area 221 by the user. The character string associated with the status of "MACHINE TRANSLATION" is a character string that is translated by the machine translation apparatus 3. The character string associated with the status of "MANUAL TRANSLATION" is a character string that is manually translated by the translator as instructed by the translator terminal 4. The number of times of UI display indicates how many times the character string is displayed at the client terminal 1.

As illustrated in FIGS. 3 and 4, the term data storage area 221 stores the term ID, the language, the translated character string, the status, and the number of times of UI display in association with one another. Accordingly, once the user ID and the language are specified, the translated character string, the status, and the number of UI display are identified.

In the example illustrated in FIG. 3, the term data storage area 221 stores the term ID "000001" in association with a character string of "For forms" of the English language. The term data storage area 221 further stores the machine-translated character strings of the "For forms" in different languages such as Japanese, Spanish, French, Italian, and Chinese, in association with the term ID "000001". In substantially the same manner, the term ID "000002" is associated with a character string of "For business card" of the English language. The term data storage area 221 further includes the machine-translated character strings of the "For business card" in different languages in association with the term ID as illustrated in FIG. 3.

FIG. 4 illustrates an example where the manually-translated character string of the specific language is stored. For example, the case is assumed where the number of times the UI of the character string "フォームの場合" [Japanese language; meaning "in the case of a form"] associated with the term ID "000001" and the language "ja" as illustrated in FIG. 3, is displayed reaches the threshold (e.g., thirty times). In this case, the image processing apparatus 2 requests the translator terminal 4 to instruct the translator to manually translate the character string "For forms", which is associated with the term ID "000001", into the language "ja". Then, the image processing apparatus 2 acquires, from the translator terminal 4, a character string "帳票用" [Japanese language; meaning "for forms" in English], which is manually translated the translator as instructed by the translator terminal 4. Further, the image processing apparatus 2 stores the acquired character string "帳票用" in the term data storage area 221 to update the term data storage area 221. Thus, the character string that is associated with the term ID "000001" and the language "ja" is changed to "帳票用" as illustrated in FIG. 4 from "フォームの場合" as illustrated in FIG. 3. In addition, the status is changed from "MACHINE TRANSLATION" to "MANUAL TRANSLATION". In addition, the number of times of UI display is changed to "–", which indicates "Don't care", as illustrated in FIG. 4.

Further, the case is assumed where the number of times the UI of the character string "名刺のための" [Japanese language; meaning "for the purpose of business cards"]

associated with the term ID "000002" and the language "ja" as illustrated in FIG. 3, is displayed reaches the threshold. In this case, the image processing apparatus 2 requests the translator terminal 4 to instruct the translator to manually translate the character string "For business cards", which is associated with the term ID "000002", into the language "ja". The image processing apparatus 2 acquires, from the translator terminal 4, a character string "名刺 用" [Japanese language; meaning "for business cards" in English], which is manually translated by the translator as instructed by the translator terminal 4. Further, the image processing apparatus 2 stores the acquired character string "名刺用" in the term data storage area 221 to update the term data storage area 221. Thus, the character string that is associated with the term ID "00002" and the language "ja" is changed to "名刺用" as illustrated in FIG. 4 from "名刺の場合" as illustrated in FIG. 3. In addition, the status is changed to "MANUAL TRANSLATION", and the number of times of UI display is changed to "−", as illustrated in FIG. 4.

The machine translation apparatus information storage area 222 stores information used by the machine translation request unit 213 when requesting the machine translation apparatus 3 to perform machine translation. Examples of the information stored in the machine translation apparatus information storage area 222 include the device information of the machine translation apparatus 3 such as an electronic mail (e-mail) address. The machine translation request unit 213 requests the machine translation apparatus 3 to perform machine translation based on the device information stored in the machine translation apparatus information storage area 222 to acquire the character strings of different languages that are machine-translated by the machine translation apparatus 3. The image processing apparatus 2 or the client terminal 1 registers such information in the machine translation apparatus information storage area 222 according to a user instruction. In this embodiment, the information processing system includes a single machine translation apparatus 3, and the machine translation apparatus information storage area 222 stores the information on the single machine translation apparatus 3. Note that, the information processing system may include a plurality of machine translation apparatuses 3. In this case, the machine translation apparatus information storage area 222 may store information on the plurality of machine translation apparatuses 3, each being associated with the different language. With such configuration, the machine translation apparatuses 3 corresponding to the different languages are able to perform machine translation.

The translator terminal information storage area 223 stores information used by the manual translation request unit 214 when requesting the translator terminal 4 to instruct the translator to perform manual translation. Examples of the information stored in the translator terminal information data storage area include includes device information of the translator terminal 4 such as an e-mail address. The manual translation request unit 214 requests the translator terminal 4 to instruct the translator to perform manual translation based on the device information stored in the translator terminal information storage area 223 to acquire the character string of the language that is manually translated by the translator as instructed by the translator terminal 4. The image processing apparatus 2 or the client terminal 1 registers such information in the translator terminal information storage area 223 according to a user instruction. In this embodiment, for simplicity, the information processing system includes a single translator terminal 4, and the translator terminal information storage area 223 stores the information on the single machine translation apparatus 3. Note that, the information processing system may include a plurality of the translator terminals 4. In this case, the translator terminal information storage area 223 may store information on the plurality of machine translation apparatuses 3, each being associated with the different language. With such configuration, the translator terminals 4 corresponding to the different languages are able to perform machine translation.

The UI unit 211 acquires the character string to be registered in the term data storage area 221 from the user. The character string registration unit 212 registers the character string acquired by the UI unit 211 in the term data storage area 221. Specifically, the UI unit 211 displays, on the control panel 23, a registration menu that allows a user to register the character string. The UI unit 211 acquires the character string that is entered via the registration menu. The character string registration unit 212 registers the character string that is entered via the registration menu in the term data storage area 221. As a specific example, a user registers a paper type such as "For forms" on the control panel 23, using a paper catalog function provided with a main unit of the image processing apparatus 2. With such configuration, the character string registration unit 212 registers the new character string in the term data storage area 221.

Further, the UI unit 211 displays, on the control panel 23, a menu that allows a user to enter an e-mail address of a person who is in charge of translation of each language and a password for accessing a menu that allows the person who is in charge of translation to register the translated term. The entered e-mail address and password are stored in the memory 22.

Furthermore, the UI unit 211 displays, on the control panel 23, a menu that allows a user to enter a threshold of the number of times of UI display. It is determined based on the entered threshold whether to request the manual translation. The entered threshold is stored in the memory 22.

Still further, the UI unit 211 displays, on the control panel 23, a menu that allows a user to enter new term data including the language, the character string, and an e-mail address of a registrant. The entered new term data is stored in the memory 22.

Still further, the UI unit 211 displays, on the control panel 23, a menu that allows a user to edit the term data. An input of a password may be required for protection to display the menu of editing the term data. Alternatively, the menu may be displayed, instead of on the control panel 23, in a device that receives a source code such as Hyper Text Markup Language (HTML) including an instruction for displaying an image. The communicator 24 may transmit such source code to the device via the network NW. The edited term data is stored in the memory 22. When the character string in the term data is changed, the status associated with the changed character string is also changed to "MANUAL TRANSLATION".

The machine translation request unit 213 requests the machine translation apparatus 3 to machine-translate the character string newly registered in the term data storage area 221 into the different languages. Specifically, in a case where the character string newly registered in the term data storage area 221 is not yet machine-translated, the machine translation request unit 213 refers to the machine translation apparatus information storage area 222 to request the machine translation apparatus 3 to machine-translate the newly registered character string into the different languages. Further, the machine translation request 213 acquires the machine-translated character strings from the machine translation apparatus 3. Furthermore, the machine translation request unit 213 stores the machine-translated character strings of different languages in the term data storage area 221 to update the term data storage area 221. With such configuration, the machine translation request unit 213 stores the machine-translated character strings of different languages in the term data storage area 221 as illustrated in FIG. 3.

The manual translation request unit 214 requests the translator terminal 4 to instruct the translator to manually translate the character string registered in the term data storage area 221. Specifically, in response to receiving the information on the term ID and the language from the client terminal 1, the character string registration unit 212 refers to the term data storage area 221 to increment the number of times of UI display by one, which is associated with the received term ID and language. The memory control unit 215 causes the memory 22 to store the incremented number of times of UI display in the term data storage area 221. Preferably, the memory control unit 215 may cause the memory 22 to store the number of times of UI display on a language-by-language basis of the character string. The determination unit 216 determines whether the number of times of UI display stored in the term data storage area 221 exceeds the preset threshold to determine which character string is to be manually translated. In a case where the number of times of UI display is stored on a language-by-language basis, the determination unit 216 determines that the character string of the specific language that is associated with the number of times of UI display exceeding the threshold is to be manually translated. The manual translation request unit 214 refers to the translator terminal information storage area 223 to request the translator terminal 4 to instruct the translator to manually translate the character string for which the determination unit 216 determines that the number of times of UI display exceeds the threshold. Further, the manual translation request unit 214 acquires the manually-translated character string from the translator terminal 4. Furthermore, the manual translation request unit 214 stores the manually-translated character string in the term data storage area 221 to update the term data storage area 221. With such configuration, the manual translation request unit 214 acquires manually-translated character string of only the character string of the specific language that needs to be manually translated from among the machine-translated character strings of different languages to update the term data storage area 221 as illustrated in FIG. 4.

The manual translation request unit 214 sends an e-mail to the e-mail address of the person who is in charge of translation or the registrant of the term to request the manual translation. Such e-mail address is stored in the memory 22 in association with the term. The communicator 24 sends the e-mail via the network NW. The e-mail may include the term ID of a term to be translated, the original term, a language of the original term, a language into which the term is to be translated (hereinafter, referred to as a "target language"), and a current term (i.e., the machine-translated character string) associated with the target language.

In response to receiving the email requesting the manual translation, the person who is in charge of translation or the registrant of the term translates the requested term into the target language and updates the term data with the translated term. Such update of the term data may be made according to an input via a menu for editing the term data, the menu being provided by the UI unit 211. Alternatively, the update of the term data may be implemented by an operation via the network NW such as returning an e-mail having a predetermined format in response to the e-mail requesting the manual translation.

For example, in a case where a term "For forms", which is an original term of a base language (e.g., English), is to be manually translated into Japanese, a person who is in charge of translation into Japanese prepares "帳票用" [Japanese language; meaning "for forms" in English] as the term data of Japanese. Further, the person who is in charge of translation in Japanese edits the term data via the UI unit 211 to replace the machine-translated "フォーム の場合" [Japanese language; meaning "in the case of a form" in English] with the manually-translated "帳票用" [Japanese language; meaning "for forms" in English] as the Japanese term of "For forms". In a case where the original term is a term of another language than the base language (e.g., English), a person who is in charge of translation of the language of the original term translates the original term into the base language (e.g., English). The person who is in charge of translation of the language of the original term may prepare an explanation about the term to be translated in a base language (e.g., English) as necessary. The registrant of the original term confirms the term that is manually-translated into the base language (e.g. English) and the explanation about the term also prepared in the base language (e.g. English) in advance to pass the manually-translated term of the base language and the explanation to the person who is in charge of translation into the target language. The person who is in charge of the translation into the target language translates the received term into the target language. Here, the base language corresponds to a language that is originally written, or which can be used as a reference.

Figure 5:
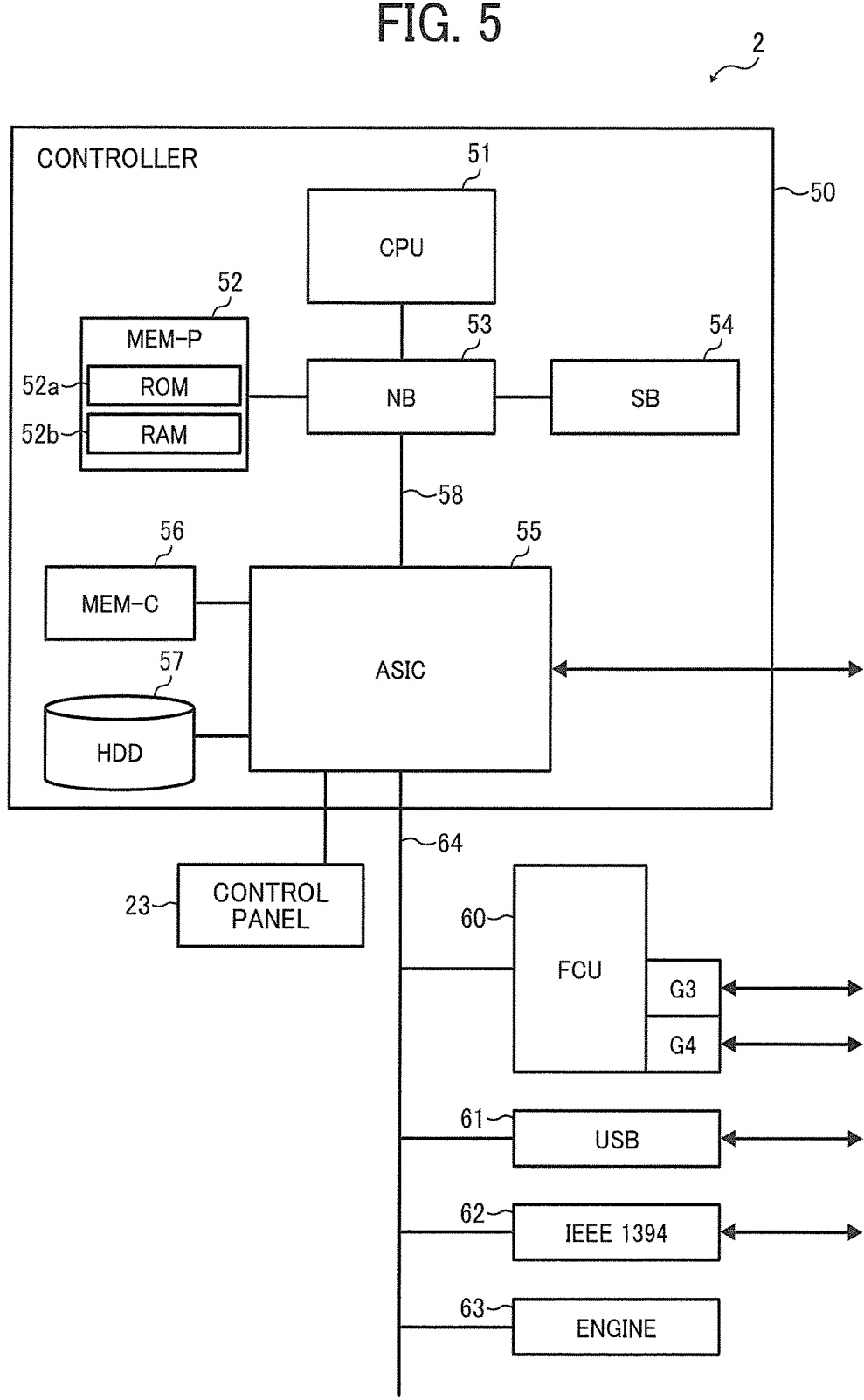
FIG. 5 is a block diagram illustrating an exemplary hardware configuration of the image processing apparatus of FIG. 2.

Hereinafter, a description is given of a hardware configuration of the image processing apparatus 2 according to this embodiment with reference to FIG. 5. As illustrated in FIG. 5, the image processing apparatus 2 according to this embodiment includes a controller 50, a facsimile control unit (FCU) 60, a universal serial bus (USB) interface 61, an IEEE 1394 interface 62, and a printer engine 63, which are connected to one another via an interface such as a peripheral component interconnect (PCI) bus 64. The controller 50 is also connected to the control panel 24 that displays various information or allows a user to input various instructions as described above. The controller 50 includes a central processing unit (CPU) 51, a system memory (MEM-P) 52, a north bridge (NB) 53, a south bridge (SB) 54, an application specific integrated circuit (ASIC) 55, a local memory (MEM-C) 56, and a hard disc drive (HDD) 57. The NB 53 and the ASIC 55 are connected via an Accelerated Graphics Port (AGP) bus 58.

The CPU 51 controls entire operation of the image processing apparatus 2.

The MEM-P 52 includes a read only memory (ROM) 52a that stores programs and data for operating the controller 50, and a random access memory (RAM) 52b that functions as a work area when the CPU 51 executes processing according to the programs stored in the ROM 52a. The CPU 51 executes the programs loaded to the RAM 52b to implement each functional block of the control unit 21 as described above.

The NB 53 includes a memory controller for controlling reading or writing of various data with respect to the MEM-P 52, a PCI master, and an AGP target.

The SB 54 connects the NB 53 with the PCI bus 64 or a peripheral device.

The ASIC 55 is an integrated circuit (IC) dedicated to image processing, and connects the AGP bus 58, the PCI bus 64, the HDD 57, and the MEM-C 56. The ASIC 55 includes a PCI target, an AGP master, an arbiter (ARB), a memory controller for controlling the MEM-C 56, a plurality of direct memory access controllers (DMACs) capable of rotating image data with a hardware logic, and a PCI unit that transfers data between the printer engine 63 through the PCI bus 64. The ASIC 55 is connected to the FCU 60, the USB 61, the IEEE 1394 interface 62, and the printer engine 63.

The MEM-C 56 is a local memory, which is used as a buffer for image data to be copied or code image. The HDD 57 stores various image data, font data for printing, and form data. The AGP bus 58 is a bus interface for a graphics accelerator card.

Exemplary Configuration of Client Terminal

Figure 6:
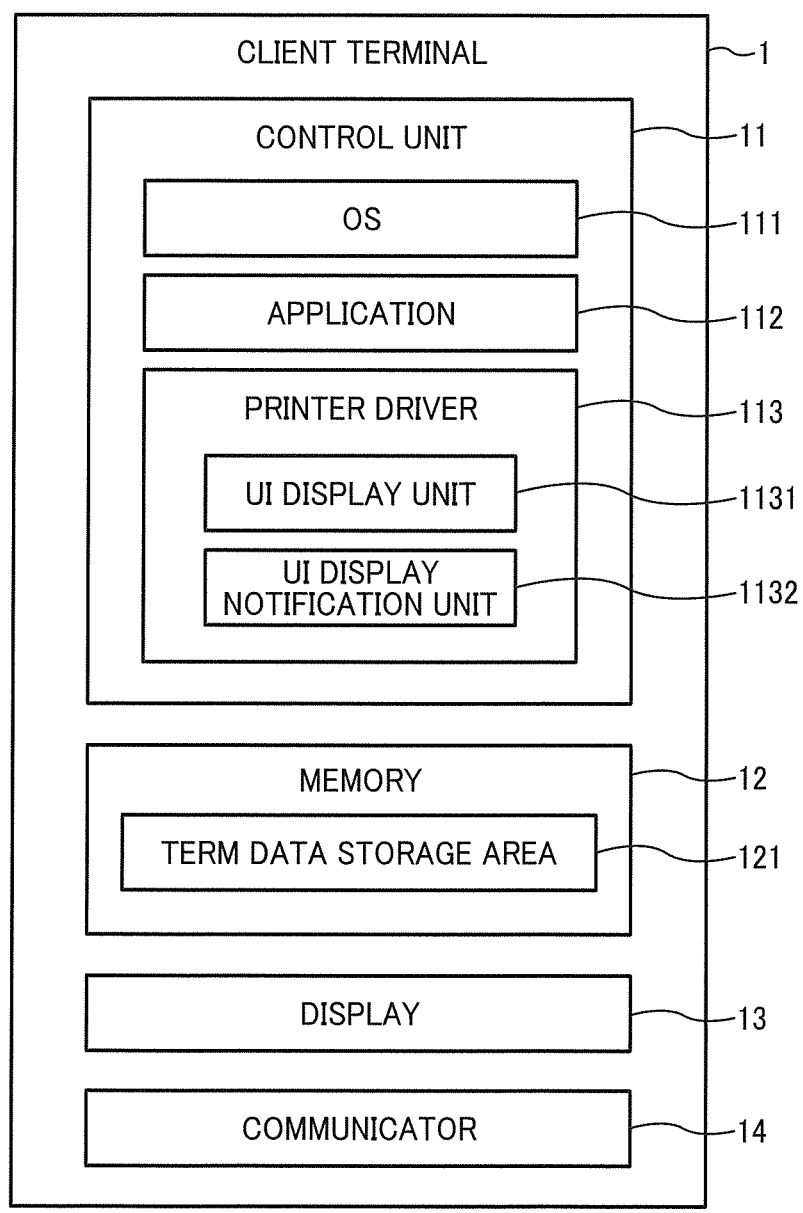
FIG. 6 is a block diagram illustrating an exemplary configuration of a client terminal included in the image processing system of FIG. 1.

Hereinafter, a description is given of an exemplary configuration of the client terminal 1 according to this embodiment with reference to FIG. 6. FIG. 6 is a block diagram illustrating an exemplary configuration of the client terminal 1 according to this embodiment.

The client terminal 1 according to this embodiment includes a control unit 11, a memory 12, a display 13, and a communicator 14. The control unit 11 controls entire operation of the client terminal 1. The memory 12 stores various information. The display 13 displays various information. The communicator 14 exchanges information with another apparatus via the network NW.

The control unit 11 includes an operating system (OS) 111, an application 112, and a printer driver 113. The memory 12 includes a term data storage area 121.

The OS 111 controls various hardware included in the client terminal 1. The application 112 generates the print data. The printer driver 113 uses the print data generated by the application 112 to cause the image processing apparatus 2 to print an image according to the print data. The application 113 and the printer driver 113 each operates via the OS Ill.

When performing printing of the printing data generated by the application 112, the printer driver 113 requests a user to set print setting. In response to receiving the print data and the print setting, the printer driver 113 converts the received print data to print data that is interpretable by the main unit of image processing apparatus 2, and adds a post-processing command corresponding to the received print setting. Then, the printer driver 113 sends the print data from the OS 111 to the image processing apparatus 2 as a print target via the network NW.

The printer driver 113 includes a UI display unit 1131 and a UI display notification unit 1132. The UI display unit 1131 acquires the term data from the term data storage area 221 of the image processing apparatus 2 to store the acquired term data in the term data storage area 121. The UI display unit 1131 continuously acquires the term data from the image processing apparatus 2 to continuously update data in the term data storage area 121 at any desired time. Thus, the term data as illustrated in FIG. 7 is stored in the term data storage area 121. Note that the UI display unit 1131 may acquire the term data from the image processing apparatus at any desired timing, as long as the term data as illustrated in FIG. 7 can be stored in the term data storage area 121. For example, the UI display unit 1131 may establish communications with the image processing apparatus 2 at the timing when the client terminal 1 loads a printer driver or application software, to acquire the term data from the term data storage area 221 of the image processing apparatus 2. As illustrated in FIG. 7, the term data storage area 121 stores the term ID, the language, the translated character string, and the status in association with one another. Further, the UI display unit 1131 refers to the term data storage area 121 and a locale of the OS 111 to select the character string of the specific language that corresponds to the locale of the OS 111 from among the character strings of different languages stored in the term data storage area 121. Then, the UI display unit 1131 displays the selected character string of the specific language on the display 13. Furthermore, the UI display unit 1131 refers to the term data storage area 121 to determine whether the status that is associated with the character string displayed on the display 13 is "MACHINE TRANSLATION". When the status that is associated with the character string displayed on the display 13 is "MACHINE TRANSLATION", the UI display unit 1131 notifies the UI display notification unit 1132 of the status "MACHINE TRANSLATION". In response to receiving such notification, the UI display notification unit 1132 sends, to the image processing apparatus 2, the information on the term ID and the language of the character string displayed on the display 13. Thus, the image processing apparatus 2 acquires the information on the term ID and the language. Based on the acquired information, the image processing apparatus 2 identifies the character string of the specific language that is referred to by the client terminal 1.

Hereinafter, a description is given of an exemplary hardware configuration of the client terminal 1 according to this embodiment with reference to FIG. 8. The client terminal 1 according to this embodiment includes a CPU 100, a RAM 101, a ROM 102, and a HDD 103, an interface (I/F) 104, a liquid crystal display (LCD) 105, and an operation unit 106.

The CPU 101 controls entire operation of the client terminal 1. The ROM 102 stores programs or data for operating the CPU 101. The RAM 102 functions as a work area for the CPU 101. The programs stored in the ROM 102 are loaded to the RAM 101 for execution. The CPU 101 executes the program loaded to the RAM 101 to implement each functional block of the control unit 11 as described above. The HDD 103 stores various types of data, such as a control program. The I/F 104 connects each of the LCD 105 and the operation unit 106 to the CPU 100. The LCD 105 displays the character strings as described above in addition to various types of information such as a cursor, a menu, a window, characters, or an image. The operation unit 106 is implemented by, for example, a mouse or a keyboard, and receives an input from a user.

The translator terminal 4 has substantially the similar hardware configuration to that of the client terminal 1 as illustrated in FIG. 8. The translator terminal 4 exchanges data with the image processing apparatus 2 via the network NW. The translator terminal 4 displays data received from the image processing apparatus 2. Further, the translator terminal 4 sends, to the image processing apparatus 2, data that is input to the translator terminal 4.

Exemplary Operation of Registering New Character String in Term Data Storage Area of Image Processing Apparatus Hereinafter, a description is given of an exemplary operation executed by the image processing apparatus 2 according to this embodiment with reference to FIG. 9. FIG. 9 is a flowchart illustrating an exemplary operation of registering the new character string in the term data storage area 221 of image processing apparatus 2.

When the UI unit 211 acquires a new character string, the character string registration unit 212 registers the acquired new character string in the term data storage area 221 (S1). Thus, the new character string is registered in the term data storage area 221. For example, a paper type represented by a character string such as "For forms" is registered, using the paper catalog function that is provided with the main unit of the image processing apparatus 2, according to a user instruction via the control panel 23. In this case, the UI unit 211 acquires the character string "For forms". Further, the character string registration unit 212 stores the character string "For forms" acquired by the UI unit 211 in the term data storage area 221.

The machine translation request unit 213 refers to the term data storage area 221 to determine whether the term data stored in the term data storage area 221 includes a character string to be machine-translated (S2). For example, the machine translation request unit 213 determines whether the term data includes a character string that is associated with only the status of "ORIGINAL". When the term data includes the character string that is associated with only the status of "ORIGINAL", the machine translation request unit 213 determines that the term data includes the character string to be machine-translated.

When the term data includes the character string to be machine-translated (S2: YES), the machine translation request unit 213 requests the machine translation apparatus 3 to machine-translate such character string to acquire the character string of the language that is machine-translated by the machine translation apparatus 3 (S3). Subsequently, the machine translation request unit 213 stores the character string of the language that is machine-translated by the machine translation apparatus 3 in the term data storage area 221 to update the term data storage area 221 (S4).

The machine translation request unit 213 repeats the processes of S2 and S3 until the machine translation request unit 213 stores the machine-translated character strings of all languages supported by the image processing apparatus 2 in the term data storage area 221. When the machine translation request unit 213 stores the machine-translated character strings of all languages supported by the image processing apparatus (S5: YES), the processing ends.

With the operation as described above, when the new character string is registered in the term data storage area 221, the character strings of all languages supported by the image processing apparatus 2 that are machine-translated from the new character string are stored in the term data storage area 221. Thus, the term data storage area 221 is able to manage the character strings of different languages as illustrated in FIG. 3. FIG. 3 illustrates an example where the character strings of different languages that are machine-translated by the machine translation apparatus 3 are stored.

Exemplary Operation Executed by Client Terminal

Figure 10:
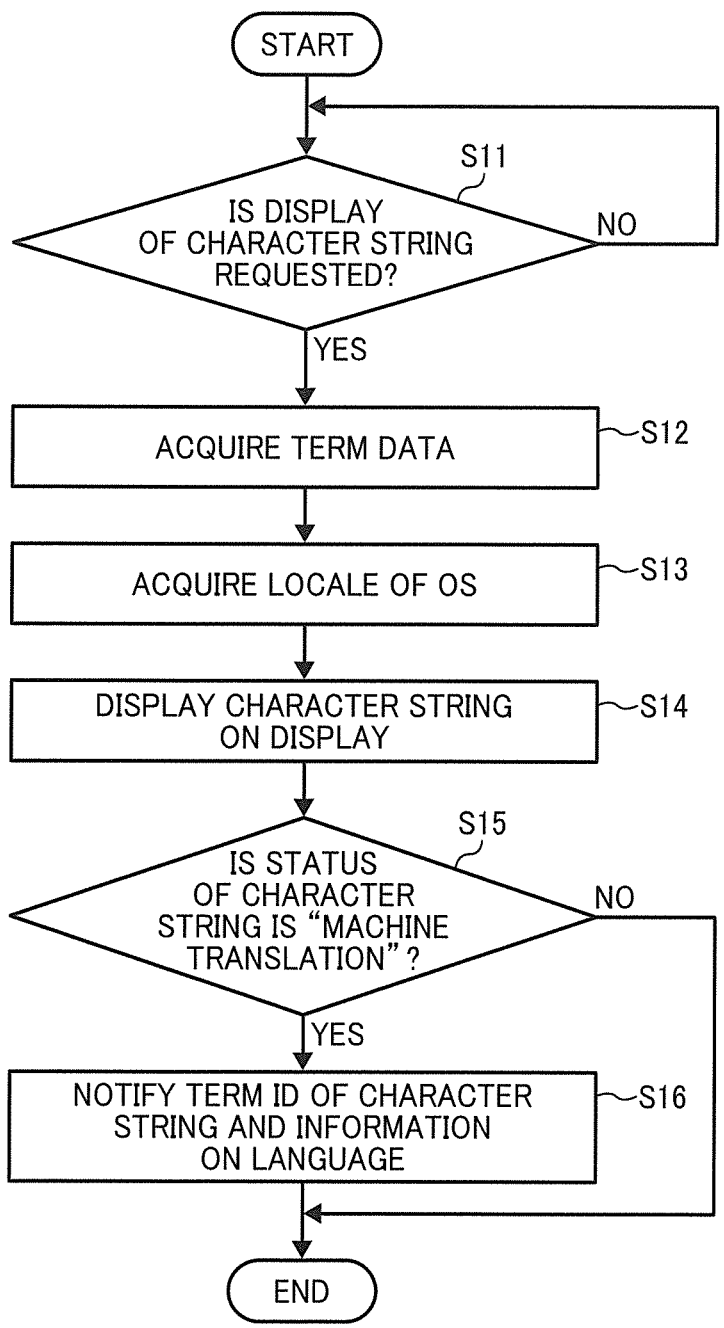
FIG. 10 is a flowchart illustrating an operation of displaying a character string on a display of the client terminal of FIG. 6.

Hereinafter, a description is given of an exemplary operation executed by the client terminal 1 according to this embodiment with reference to FIG. 10. FIG. 10 is a flowchart illustrating an exemplary operation of displaying a character string on the display 13 of the client terminal 1.

The UI display unit 1131 determines whether a display request for displaying the character string on the display 13 is received (or input)(S11). When the UI display unit 1131 determines that the display request is made (S11: YES), the UI display unit 1131 causes the communicator 14 to communicate with the image processing apparatus 2 via the network NW to acquire the most recent term data from the image processing apparatus 2 (S12). Further, the UI display unit 1131 stores the acquired most recent term data in the term data storage area 121. Subsequently, the UI display unit 1131 acquires the locale of the OS 111 (S13). Then, the UI display unit 1131 selects the character string of the specific language that corresponds to the locale of the OS 111 from among the character strings of different languages stored in the term data storage area 121, to display the selected character string of the specific language on the display 13 (S14). The display request is made, for example, in response to the display of a dialog box, in a case where the character string is displayed as a label in the dialog box. As another example, the request for display is made in response to a user operation of clicking a drop-down list, in a case where the character string is displayed as one of selectable items in the drop-down list.

When the UI display unit 1131 displays the character string on the display 13, the UI display unit 1131 refers to the term data storage area 121 to determine whether the status that is associated with the character string displayed on the display 13 is "MACHINE TRANSLATION" (S15). When the status that is associated with the character string displayed on the display 13 is "MACHINE TRANSLATION" (S15: YES), the UI display unit 1131 notifies the UI display notification unit 1132 that the status is "MACHINE TRANSLATION". In response to receiving the notification indicating that the status is "MACHINE TRANSLATION", the UI display notification unit 1132 sends, to the image processing apparatus 2, the information on the term ID and the language of the character string displayed on the display 13 (S16). With the operation as described above, in a case where the character string displayed on the display 13 of the client terminal 1 is a character string of the language that is machine-translated, the information on the character string is sent to the image processing apparatus 2. Based on the information received from the UI display notification unit 1132, the image processing apparatus 2 is able to acquire the number of times of UI display of the machine-translated character string displayed at the client terminal 1. In a case where the UI display unit 1131 displays two or more character strings at one time on the display 13, the processes of S15 and S16 are performed on each character string.

Figure 11:
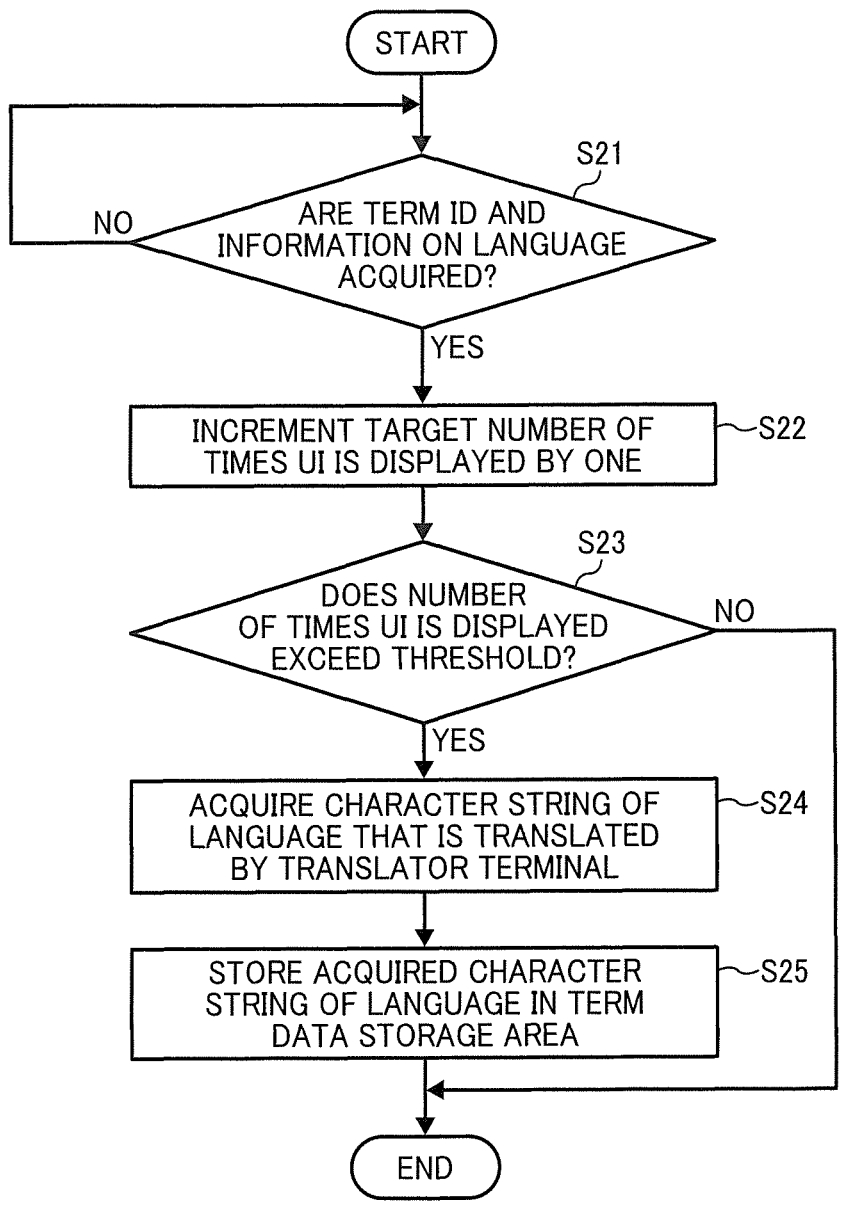
FIG. 11 is a flowchart illustrating an operation of acquiring manually-translated character string according to an embodiment of the present invention.

Exemplary Operation of Acquiring Manual Translation of Character String in Term Data Storage Area Hereinafter, a description is given of an exemplary operation executed by the image processing apparatus 2 to acquire manual translation of the character string stored in the term data storage area 221 with reference to FIG. 11. FIG. 11 illustrates an exemplary operation of determining whether to manually-translate the character string stored in the term data storage area 221 and acquiring the manually-translated character string.

When the image processing apparatus 2 acquires the information on the term ID and the language from the client terminal 1 (S21: YES), the character string registration unit 212 refers to the term data storage area 221 to increment the number of times of UI display by one, which is associated with the received term ID and language (S22). Subsequently, the character string registration unit 212 determines whether the number of times of UI display exceeds the preset threshold (S23). When the character string registration unit 212 determines that the number of times of UI display exceeds the threshold (S23: YES), the manual translation request unit 214 refers to the translator terminal information storage area 223 to request the translator terminal 4 to instruct the translator to manually translate the character string of the specific language for which the character string registration unit 212 determines that the number of time of UI display exceeds the threshold. Then, the manual translation request unit 214 acquires the manually translated character string of the specific language from the translator terminal 4 (S24). Then, the manual translation request unit 214 stores the manually translated character string of the specific language in the term data storage area 221 to update the term data storage area 221 (S24). With the operation as described above, the manual translation request unit 214 causes the translator terminal 4 to translate only the character string of the specific language that needs to be manually translated from among the machine-translated character strings of different languages to update the term data storage area 221. Thus, the term data storage area 221 is able to manage the character strings of different languages as illustrated in FIG. 4. FIG. 4 illustrates an example where the character string of the specific language that is manually translated by the translator as instructed by the translator terminal 4 is stored.

Hereinafter, a further detailed description is given of the process at S22 of incrementing the number of times of UI display with reference to FIGS. 12 to 15. FIGS. 12 to 15 each illustrates an example of a dialog box of a printer driver displayed on the display 13 of the client terminal 1. The dialog box includes the character string. When the dialog box is displayed on the display 13, the client terminal 1 notifies the image processing apparatus 2 of information on the character string included in the dialog box, depending on whether the status of the character string is "MACHINE TRANSLATION".

Figure 12:
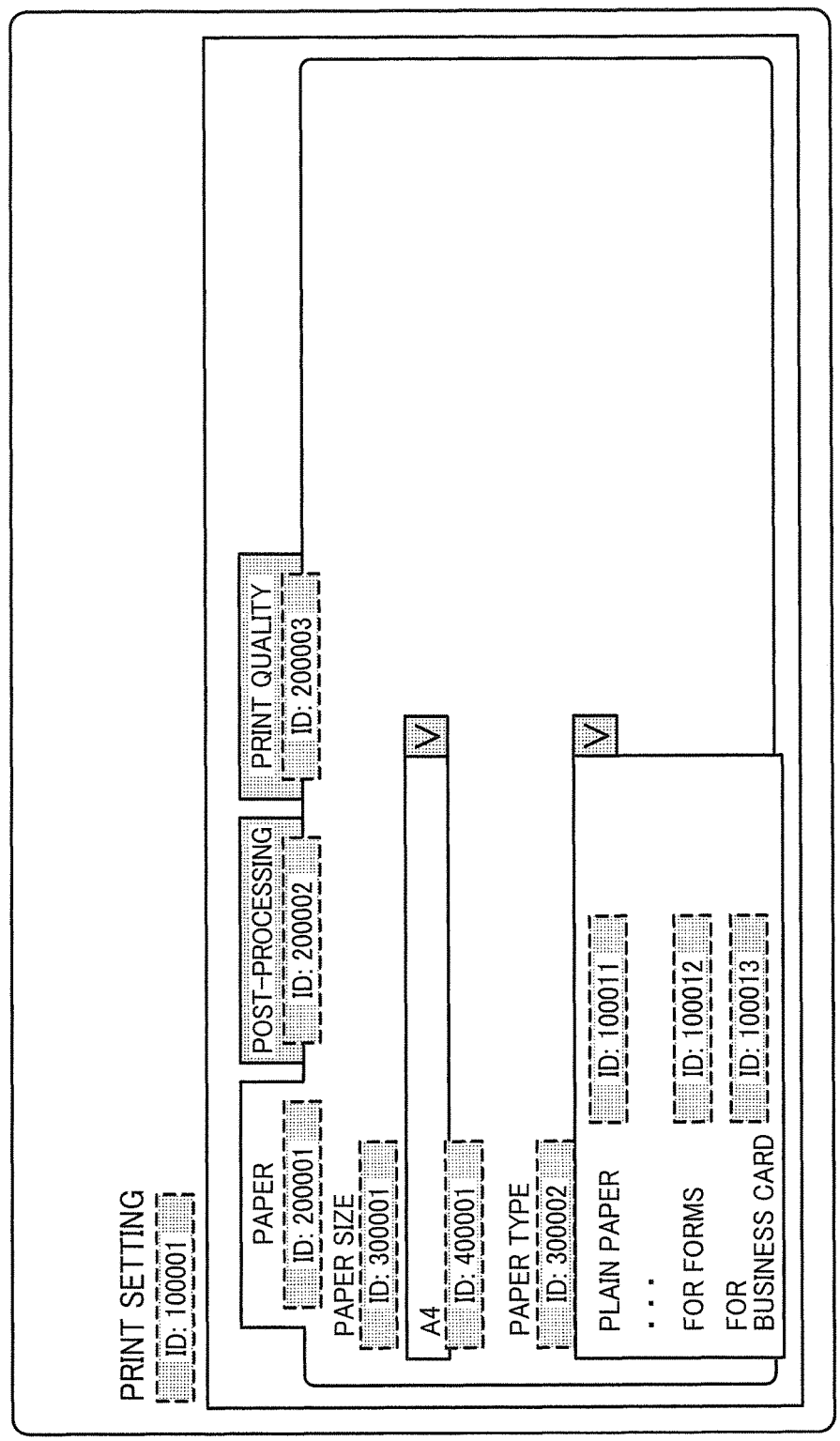
FIG. 12 illustrates an exemplary schematic configuration of a dialog box of a printer driver according to an embodiment of the present invention.

FIG. 12 illustrates an exemplary schematic configuration of the dialog box of the printer driver. The dialog box illustrated in FIG. 12 includes a character string "PRINT SETTING", which is displayed as a label, for example. A diagonally shaded area containing a character string "ID: 00001" below the character string "PRINT SETTING" is illustrated just for the description, and is not displayed on an actual screen. The "ID: 00001" indicates an ID that is associated with the character string "PRINT SETTING". In substantially the similar manner, every character string displayed in the dialog box of the printer driver is associated with a unique ID. Accordingly, the character string specified by the locale of the OS and the ID is displayed in the dialog box.

Figure 13:
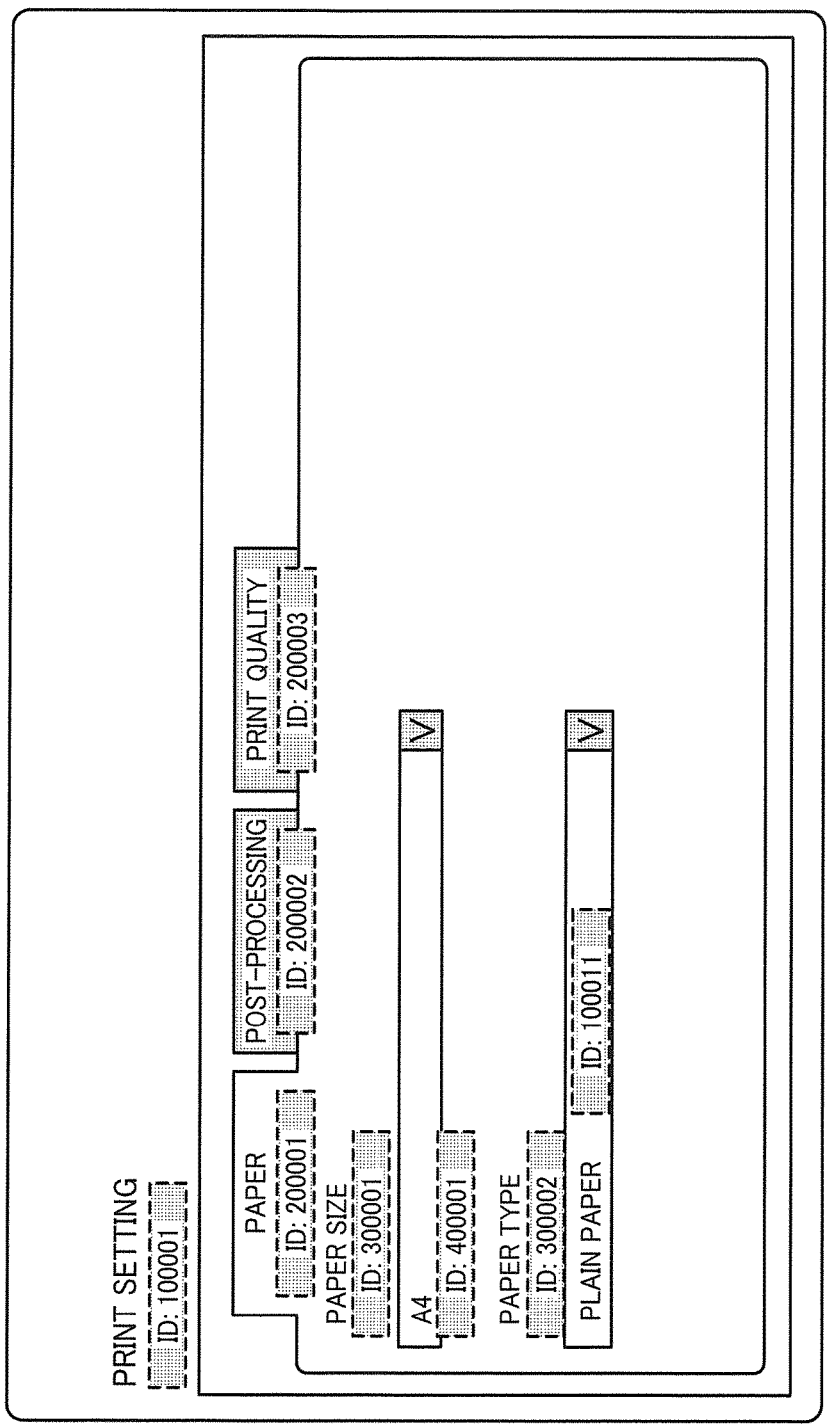
FIG. 13 is an illustration for explaining an operation of incrementing the number of times a user interface (UI) is displayed when activating a printer driver to display a dialog box according to an embodiment of the present invention.

FIG. 13 is an illustration for explaining an operation of incrementing the number of times of UI display when the dialog box is displayed in response to activation of the printer driver. When the printer driver is activated at the client terminal 1, the dialog box as illustrated in FIG. 13 is displayed on the display 13. As described with reference to FIG. 12, the IDs illustrated in FIG. 13 are not displayed on the actual screen.

When the dialog box as illustrated in FIG. 13 is displayed in response to the activation of the printer driver, the number of times of UI display is incremented, for every character string displayed in the dialog box. The character strings each corresponds to a label. In the example illustrated in FIG. 13, the character strings "PRINT SETTING", "PAPER SIZE", "A4", "PAPER TYPE", "PLAIN PAPER", "POST-PROCESSING", and "PRINT QUALITY", which are respectively associated with the IDs 100001, 200001, 300001, 400001, 300002, 100011, 200002, and 200003, are displayed in the dialog box. Accordingly, the numbers of times of UI display associated with respective ones of those character strings are incremented.

In the example as illustrated in FIG. 13, neither a "POST-PROCESSING" tab nor a "PRINT QUALITY" tab is opened yet. Accordingly, the number of times of UI display that is associated with a character string corresponding to a function that is displayed when those tabs are opened is not incremented. In addition, in a drop-down list such as "PAPER TYPE" that displays a list of selectable items to in response to an operation, only an initial value (e.g., "PLAIN PAPER" in the example of "PAPER TYPE") is displayed when the dialog box is displayed in response to the activation of the printer driver. Accordingly, the number of times of UI display that is associated with the character string of the initial value is incremented, while the number of times of UI display that is associated with a character string of an undisplayed item other than the character string of the initial value is not incremented.

Figure 14:
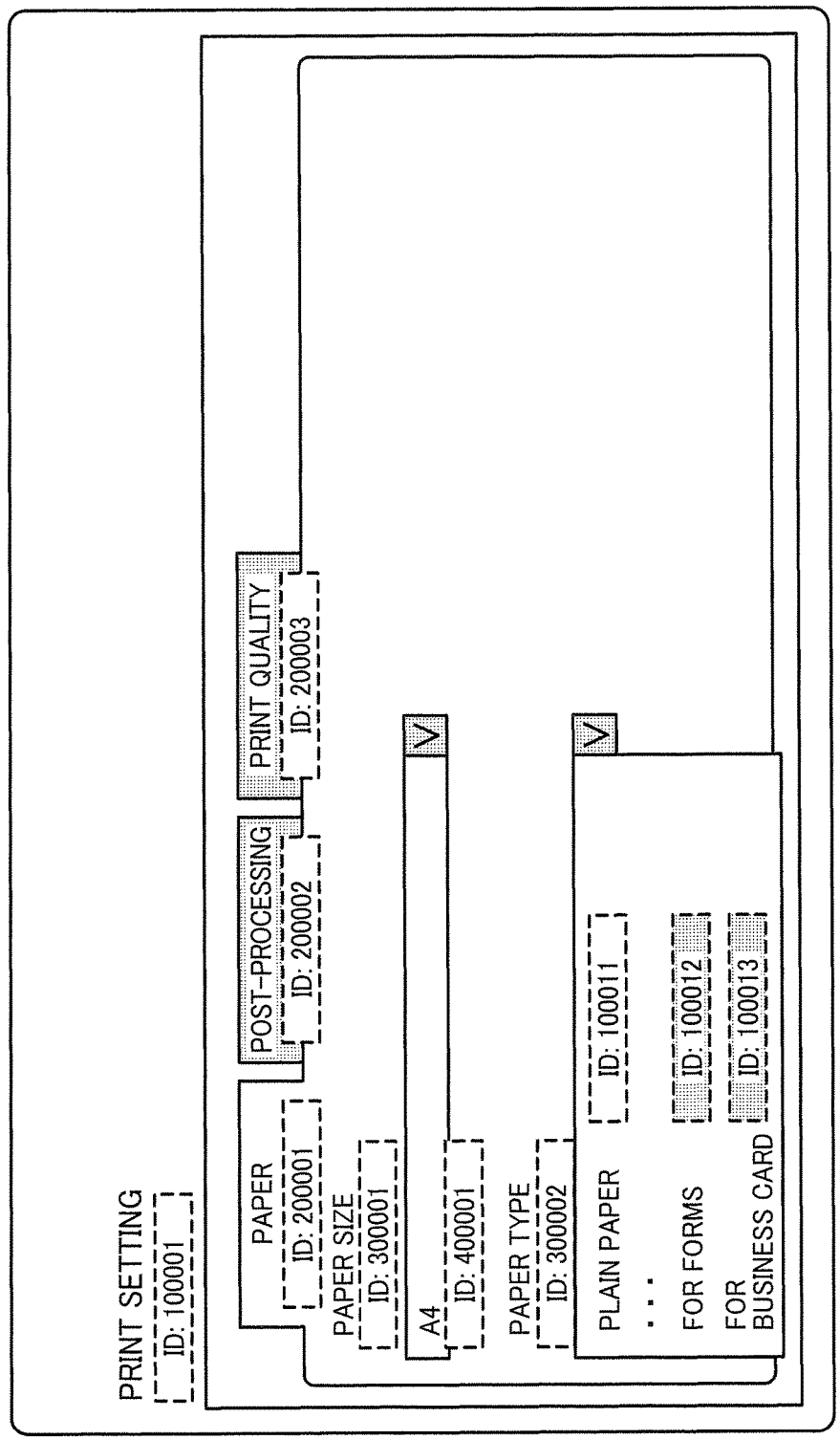
FIG. 14 is an illustration for explaining an operation of incrementing the number of times a UI is displayed when displaying a list of selectable items of a drop-down list in a dialog box of a printer driver according to an embodiment of the present invention.

FIG. 14 is an illustration for explaining an operation of incrementing the number of times of UI display when operating the drop-down list in the dialog box of the printer driver to display the other selectable items than the initial value. As described with reference to FIG. 12, the IDs illustrated in FIG. 14 are not displayed on the actual screen.

In response to an operation such as clicking a down arrow key on the right end of an area in which the initial value "PLAIN PAPER" is displayed below the "PAPER TYPE" in the dialog box illustrated in FIG. 13, an area in which character strings are to be displayed is enlarged downwardly as illustrated in FIG. 14. In such enlarged area, a list of candidate character strings to be selected as the "PAPER TYPE" is displayed. In an example as illustrated in FIG. 14, a character string "FOR FORMS" associated with the ID 10012 and a character string "FOR BUSINESS CARD" associated with the ID 100013 are displayed in the enlarged area. Accordingly, the numbers of times of UI display associated with respective one of those character strings are incremented. In FIG. 14, the ID associated with the character string of which number of times of UI display is to be incremented is hatched to be distinguished from the ID associated with the already-displayed character string of which number of times of UI display is not to be incremented.

Figure 15:
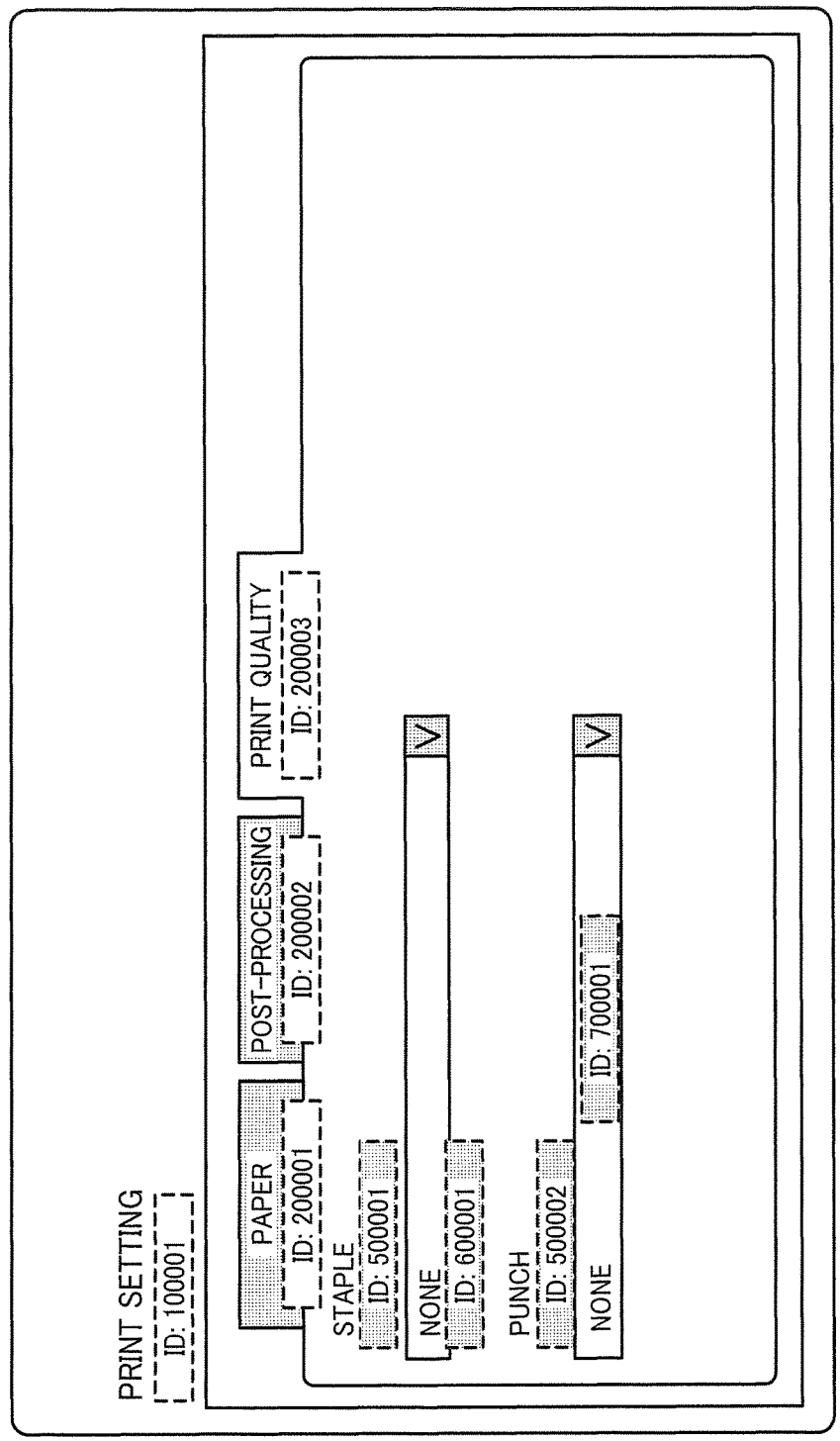
FIG. 15 is an illustration for explaining an operation of incrementing the number of times a UI is displayed when switching a display tab in a dialog box of a printer driver according to an embodiment of the present invention.

FIG. 15 illustrates an operation of incrementing the number of times of UI display when switching a display tab in the dialog box of the printer driver. As described with reference to FIG. 12, the IDs illustrated in FIG. 15 are not displayed on the actual screen.

In response to an operation such as clicking an area of the "POST-PROCESSING" tab in the dialog box illustrated in FIG. 13, an operation menu of a group of various functions relating to post-processing is displayed as illustrated in FIG. 15. In an example as illustrated in FIG. 15, the character strings "STAPLE", "NONE", "PUNCH" and "NONE", which are respectively associated with IDs 500001, 600001, 500002, and 700001 are displayed in the operation menu. Accordingly, the numbers of times of UI display associated with respective ones of those character strings are incremented. In this example, the character string "NONE" associated with the ID 600001 is an initial value of the drop-down list "STAPLE". In addition, the character string "NONE" associated with the ID 700001 is an initial value of the drop-down list "PUNCH". In FIG. 15, some of the IDs are hatched in substantially the same manner as FIG. 14.

Hereinafter, a further detailed description is given of the process at S24 of requesting manual translation with reference to FIGS. 16 and 17.

As described above as the operation by the manual translation request unit 214, the manual translation is requested via the e-mail sent to the e-mail address of the person who is in charge of translation or the registrant of the term. Hereinafter, the person who is in charge of translation and the registrant of the term are also collectively referred to as a "translator". The e-mail includes a uniform resource locator (URL) used for accessing the menu for editing the term data. Such menu is provided by the UI unit 211 as described above. The URL includes an identifier that is unique to each request for manual translation. The memory 22 stores the relation between the request for manual translation and the identifier.

FIG. 16 is a view illustrating an example of a table stored in the memory 22. The table contains the request for manual translation in association with the identifier. In an example as illustrated in FIG. 16, a request e-mail of a request ID 000001 includes an URL containing the corresponding identifier as follows:

http://192.168.10.11/wording/
yp05wiYN0DFjLIaQkzuebsmox
9KcqLRh?key=OFcIA_2AYrLAMeMY28tULHZXKzxfI The identifier may be in any form as long as it does not overlap with that of another request for manual translation. Note that a random character string as above is preferable because the use of such character string makes it difficult for unauthorized malicious third parties to access the menu.

When the translator receives the request e-mail at the translator terminal 4 and accesses the URL described in the received e-mail, a predetermined code is sent from the image processing apparatus 2. Upon receiving the code, the translator terminal 4 displays a web form that allows the translator to register the translated term. FIG. 17 is a view illustrating an example of the web form displayed at the translator terminal 4 that allows the translator to register the translated form. The translator confirms a term to be translated and a language into which the term is to be translated on the displayed web form as illustrated in FIG. 17. After such confirmation, the translator enters the translated term. In response to an operation of clicking a registration key in the left-bottom portion of the web form, the entered translated term is sent to the image processing apparatus 2. Accordingly, the term data in the term data storage area 221 is updated.

When the UI display unit 1131 of the client terminal 1 displays the character string, the UI display unit 1131 acquires the most recent term data from the image processing apparatus 2, as described above with reference to FIG. 10. Accordingly, when the term data in the term data storage area 221 of image processing apparatus 2 is updated, the updated term is used for the display of the character string at the client terminal 1.

As described heretofore, in the information processing system according to this embodiment, the image processing apparatus 2 acquires the information on the machine-translated character string that is referred to by the user at the client terminal 1. Based on the acquired information on the character string, the image processing apparatus 2 determines that the character string referred to by the user more than a threshold number of times needs to be manually translated. The translator at the translator terminal 4 manually translates such character string. With such configuration and operation, the character string of the specific language that is referred to by the user more frequently is manually translated over other character strings.

The information processing system according to this embodiment includes the paper catalog function that allows the user to register the user's own paper type in the image processing apparatus 2. Using such paper catalog function, the user is able to register a paper type "For forms", which means "帳票用" [Japanese language; meaning "for forms" in English], in the paper catalog in the main unit of the image processing apparatus 2. The image processing apparatus 2 causes the machine translation apparatus 3 to machine-translate the character string "For forms" registered in the main unit of the image processing apparatus 2 into the different languages.

When the client terminal 1 sends a job to the image processing apparatus 2 according to a user instruction to cause the image processing apparatus 2 to form an image, the printer driver 113 of the client terminal 1 communicates with the main unit of the image processing apparatus 2 to acquire the character string of the paper type that is registered in the main unit of the image processing apparatus 2. Then, the client terminal 1 displays the acquired character string of the paper type in a menu of selectable items of the paper catalog. In a case where the locale of the OS ill of the client terminal 1 is English, the character string "For forms" is displayed in the menu of selectable items of the paper catalog without any hindrance. By contrast, in a case where the locale of the OS 111 of the client terminal 1 is Japanese, the character string "フォームの場合" [Japanese language; meaning "in the case of a form" in English] is displayed in the menu of selectable items of the paper catalog. In other words, the character string that is translated in a meaning different from the user's intention is displayed. However, in a case where the user is not able to understand the Japanese language, he/she is not able to judge whether the machine-translated term "フォー ムの場合" is a correct translation.

To address such issue, in the information processing system according to this embodiment, the image processing apparatus 2 acquires the information on the machine-translated character string that is referred to by the user at the client terminal 1. Based on the acquired information on the character string, the image processing apparatus 2 determines that the character string referred to by the user more than a threshold number of times needs to be manually translated. Thus, the image processing apparatus 2 is able to determine which character string needs to be manually translated from among the machine-translated character strings of different languages. Further, the image processing apparatus 2 requests the translator terminal 4 to instruct the translator to manually translate the character string that is determined to be manually translated. With such configuration and operation, the information processing system according to this embodiment is able acquire manual translation of the character string of the specific language that is referred to by the user more frequently over other character strings. Further, because only the character string of the specific language that is referred to by the user more frequently is manually translated, a time period required for translation is shortened.

A description has been given above of the embodiment where the image processing apparatus 2 determines whether the number of times of UI display exceeds the threshold, and, based on the determination result, refers to the translator terminal information storage area 223 to request the translator terminal 4 to instruct the translator to manually translate the character string associated with the number of times of UI display exceeding the threshold. Alternatively, the manual translation operation may be performed as described below.

Specifically, the translator terminal information storage area 223 is caused to store information on the translator terminal 4 used by the translator who manually translates the base language (e.g., English) as well as information on the translator terminals 4 used by the translators who manually translate other different languages. When the number of times of UI display exceeds the threshold, the image processing apparatus 2 refers to the translator terminal information storage area 223 to request the translator terminal 4 used by the translator who manually translates the base language to instruct the translator to manually translate the machine-translated character string of the base language.

After the manual translation of the machine-translated character string of the base language is completed, the image processing apparatus 2 refers to the translator terminal information storage area 223 to send a request for manually translating the machine-translated character string of the specific language associated with the number of times of UI display exceeding the threshold to the translator terminal 4 used by the translator who manually translates the specific language. In this case, the image processing apparatus 2 requests the translator terminal 4 to instruct the translator to manually translate the machine-translated character string of the specific language associated with the number of times of UI display exceeding the threshold based on the manually translated character string of the base language. In general, a term is sometimes translated first into a base language such as English, and thereafter translated into other languages based on the terms translated into the base language. Accordingly, the manual translation is executed efficiently by causing the translator terminal 4 to instruct the translator to manually translate the machine-translated character string of the base language, and thereafter requesting the translator terminal 4 to instruct the translator to manually translate the character string of the specific language that is associated with the number of times of UI display exceeding the threshold. Note that the translator terminal 4 may instruct the translator to manually translate the character string of the base language in advance.

In addition, in the embodiment described above, the memory 22 may store an e-mail address of the user who has registered the new character string in the term data storage area 221 of the image processing apparatus 2. In response to receiving the manually translated character string from the translator terminal 4, the image processing apparatus 2 may send an e-mail to the e-mail address of the user who has registered the new character string to notify the user of the manually translated character string. It is sometimes hard to determine whether the manually translated character string is correct in meaning without understanding the intention of the user who has registered the new character string. The user who has registered the new character string is able to confirm whether the manually-translated character string matches the user's intention based on the notification from the image processing apparatus 2.

Note that the information processing system according to this embodiment may include a plurality of the client terminals 1. In a case where the information processing system includes the plurality of the client terminals 1, the UI unit 211 of the image processing apparatus 2 receives the registrations of new terms from respective ones of the plurality of the client terminals 1. In addition, in the operation described with reference to FIG. 11, when the image processing apparatus 2 acquires, from the plurality of the client terminals 1, the notification of the number of times of UI display together with the information on the term ID and the language, the character string registration unit 212 sums up every number of times of UI display received from the plurality of the client terminal 1s, to increment the number of times of UI display in the term data storage area 221 based on the sum. With such configuration, the image processing apparatus 2 is able to determine which character string is to be manually translated based on the number of times of the UI display in all of the plurality of the client terminals 1.

Hereinafter, a description is given of the information processing system according to another embodiment of the present invention.

As described above with reference to FIG. 1, the information processing according to the above-described embodiment includes the image processing apparatus 2. The image processing apparatus 2 includes the term data storage area 221 that stores the character strings of different languages. The machine translation apparatus 3 machine-translates the character strings stored in the term data storage area 221. The translator terminal 4 instructs the translator to manually translate the character string stored in the term data storage area 221.

Figure 18:
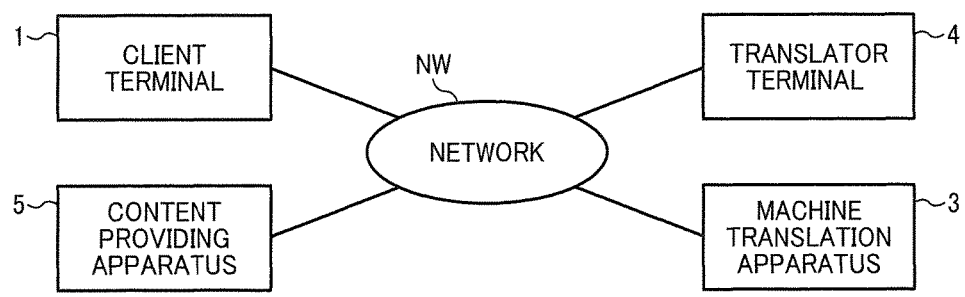
FIG. 18 is a schematic view illustrating an exemplary configuration of an information processing system according to another embodiment of the present invention.

By contrast, the information processing system according to another embodiment of the present invention includes the content providing apparatus 5, as illustrated in FIG. 18. The content providing apparatus 5 provides the client terminal 1 with contents. Examples of the contents to be provided to the client terminal include a character string, a still image, motion video, and music. The content providing apparatus 5 that provides the character string is implemented by, for example, a cloud server of an IT service provider system. The client terminal 1 accesses the cloud server of the system as the content providing apparatus 5 to display character string data such as a pay slip for viewing. In the information processing system according to this embodiment, the content providing apparatus 5 makes contents available via the network NW. An arbitrary number of the client terminals 1 views the contents provided by the content providing apparatus 5 via the network NW.

In the information processing system according to this embodiment, the machine translation apparatus 3 machine-translates the character strings of different languages that are used in the contents provided by the content providing apparatus 5, and the translator terminal 4 instructs the translator to manually translate the character strings of different languages. Further, the content providing apparatus 5 requests the translator terminal 4 to instruct the translator to manually translate the character string associated with the number of times of UI display exceeding the threshold in substantially the same manner as the above-described embodiment. With such configuration, the machine-translated character string that is referred to by the user more frequently from among the character strings of different languages that are used in the contents provided by the content providing apparatus 5 is manually translator over the other character strings. Hereinafter, a description is given of the information processing system according to this embodiment with reference to FIG. 18.

Exemplary Configuration of Information Processing System

First, a description is given of an exemplary configuration of the information processing system according to this embodiment with reference to FIG. 18.

As illustrated in FIG. 18, the information processing system according to this embodiment includes the client terminal 1, the content providing apparatus 5, the machine translation apparatus 3, and the translator terminal 4. The client terminal 1, the content providing apparatus 5, the machine translation apparatus 3, and the translator terminal 4 are connected to one another via the network NW. The network NW may support any communication modes, regardless of wired or wireless.

Figure 19:
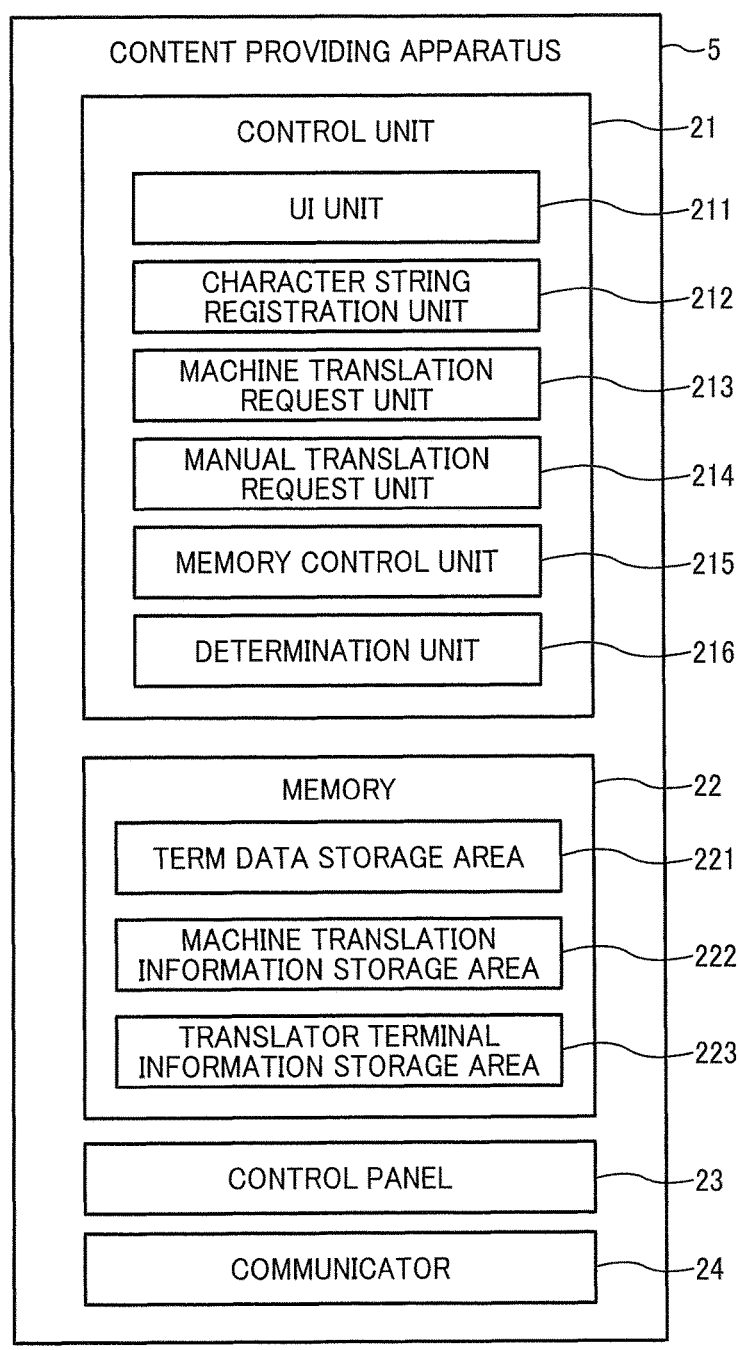
FIG. 19 is a block diagram illustrating an exemplary configuration of a content providing apparatus included in the information processing system of FIG. 18.

The information processing system according to this embodiment includes the content providing apparatus 5, which provides the client terminal 1 with the contents. FIG. 19 is a block diagram illustrating an exemplary configuration of the content providing apparatus 5 according to this embodiment. The content providing apparatus 5 is different from the image processing apparatus 2 in that the content providing apparatus 5 provides the client terminal 1 with the contents while the image processing apparatus 2 provides the client terminal 1 with the function of image processing. Except for such difference, the content providing apparatus 5 is substantially similar to the image processing apparatus 2, for the function of providing the character string displayed as the UI. Accordingly, as illustrated in FIG. 19, the content providing apparatus 5 has substantially the similar configuration to that of the image processing apparatus as illustrated in FIG. 2. Therefore, redundant descriptions of the functional blocks are omitted below.

The client terminal 1 accesses the content providing apparatus 5 to display the contents provided by the content providing apparatus 5 for viewing. Further, the client terminal 1 is able to write data into the contents provided by the content providing apparatus 5. When the character strings that are used in the contents provided to the client terminal 1 include the character string to be machine-translated, the content providing apparatus 5 requests the machine translation apparatus 3 to machine-translate the character string to acquire the machine-translated character strings of different languages. Further, when the character strings that are used in the contents provided to the client terminal 1 include the character string to be manually translated, the content providing apparatus 5 requests the translator terminal 4 to instruct the translator to manually translate the character string to acquire the manually-translated character strings of a specific language.

Specifically, in a case where the client terminal 1 displays the contents provided by the content providing apparatus 5 for viewing on a web browser, the content providing apparatus 5 acquires a locale of the web browser using JavaScript (registered trademark), for example. The content providing apparatus 5 switches to a language corresponding to the acquired locale of the web browser. Further, the content providing apparatus 5 requests the translator terminal 4 to instruct the translator to manually translate the character string associated with the number of times of UI display exceeding the threshold in substantially the same manner as described with reference to FIG. 11. With such configuration, the machine-translated character string that is referred to by the user more frequently from among the character strings of different languages that are used in the contents provided by the content providing apparatus 5 is manually-translated over other character strings.

Hereinafter, a description is given of an operation of registering, translating, and displaying the character string, performed by the IT service provider system as the information processing system according to this embodiment. First, the UI unit 211 provides a menu for registering an e-mail address of the translator of each language and a password for accessing a menu that allows the translator to register the translated term. This menu is provided as a web content. In this case, the web browser 13 displays the menu for registration on the display 13 of the client terminal 1. A server administrator, who views this menu, enters the e-mail address of the translator and the password for registration. The entered e-mail address and password are sent to the content providing apparatus 5 and stored in the memory 22.

Further, the UI unit 211 provides a menu for registering a threshold of the number of times of UI display. It is determined based on the registered threshold whether to request the manual translation. Like the above-described menu for registering the e-mail address and the password, this menu for registering the threshold is also provided as a web content. Also, the server administrator, who views the menu for registering the threshold, enters the threshold for registration, in substantially the same manner as described for the registration of the e-mail address and the password.

Furthermore, the UI unit 211 provides a menu that allows a user to register new term data. A user registers the new term data including a language, a character string, and an e-mail address of a registrant via the menu provided by the UI unit 211. The registered new term data is stored in the term data storage area 221. The system may generate a template format of a menu as the UI when providing the user with contents.

Still further, the UI unit 211 provides the translator terminal 4 with a menu for editing the term data. When providing the menu for edit of the term data to the translator terminal 4, the UI unit 211 may request an input of the password. The translator replaces the term displayed on the menu for editing the term data with the translated term for registration. The registered term is stored in the term data storage area 221, the status associated with the edited term is changed to "MANUAL TRANSLATION" from "MACHINE TRANSLATION". The content providing apparatus 5 generates a screen based on the term data stored in the term data storage area 221 and provides the client terminal 1 with the generated screen. Accordingly, the replaced term is immediately reflected in the contents.

For example, in a case the number of times of UI display that is associated with the language "ja" and the same term ID as that of an original term "Pay slip" of the base language (e.g., English) exceeds the threshold, the manual translation request unit 214 sends, to the e-mail address of the translator, an e-mail including a URL for accessing the menu for editing the term data. The translator accesses the URL included in the e-mail and replaces a machine-translated term "有料スリップ" [Japanese language; meaning "chargeable slip" in English] with a term "給与明細" [Japanese language; meaning "pay slip" in English] for registration.

In a case where an original term of the term to be translated is in another language than the base language, a person who is in charge of translation into the language of the original term translates the term into the base language. The person who is in charge of translation into the language of the original term may prepare an explanation about the term to be translated in the base language. The translator of the target language translates the term with reference the manually-translated term of the base language and the prepared explanation.

Figures 20, 21:
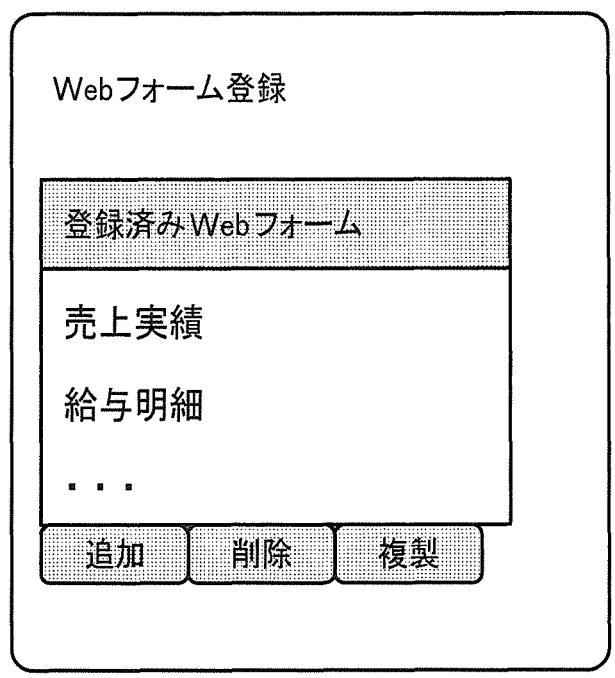
FIG. 20 is a view illustrating an example of a menu for registering a web form, which is a template format of a content provided by the content providing apparatus of FIG. 19.
FIG. 21 is a view illustrating an example of translator data according to an embodiment of the present invention.

Hereinafter, a description is given of an operation of generating a template format of a menu as the registration of new term according to this embodiment. FIG. 20 is a view illustrating an example of a menu for registering a web form, which is a template format of a content provided by the content providing apparatus 5. The menu for registering a web form is referred to as a "web form registration menu" hereinafter. The web form registration menu illustrated in FIG. 20 includes character strings "Web フォーム登録", [Japanese language; meaning "web form registration" in English], "登録済み Web フォーム" [Japanese language; meaning "registered web form" in English], "売上実績" [Japanese language; meaning "sales record" in English], "給与明細" [Japanese language; meaning "pay slip" in English], "追加" [Japanese language; meaning "add" in English], "削除" [Japanese language; meaning "delete" in English], and "複製" [Japanese language; meaning "copy" in English]. Among these character strings, the translation is performed on two character strings "売上実績" and "給与明細", each being a name of the web form which the user can name arbitrarily in the template format.

Hereinafter, a description is given of an example of translator data. FIG. 21 is a view illustrating an example of the translator data. As illustrated in FIG. 21, the translator data includes an e-mail address of a person who is in charge of translation in association with a language. In this embodiment, the translator data is stored in the translator terminal information storage area 223 of the content providing apparatus 5. The translator terminal information storage area 223 of the image processing apparatus 2 may also substantially the same translator data as illustrated in FIG. 21.

Hereinafter, a description is given of an example of the term data. FIG. 23 is a view illustrating an example of the term data stored in the term data storage area 221 of the content providing apparatus 5. Comparing the term data illustrated in FIG. 22 with that of FIG. 3, the term data in the column of "TRANSLATED CHARACTER STRING" are different. Further, in the term data illustrated in FIG. 22, a column of "E-MAIL ADDRESS OF PERSON WHO REGISTERED TERM" is added. The difference of the term data in the column of "TRANSLATED CHARACTER STRING" results from the difference of the UI provided to the client terminal 1. The term data stored the term data storage area 221 of the content providing apparatus 5 may vary depending on the UI provided to the client terminal 1.

In this embodiment, the term data storage area 221 stores an e-mail address of a person who registers an original term in the added column of "E-MAIL ADDRESS OF PERSON WHO REGISTERED TERM" in association with the original term. With such configuration, when the manually translated character string of the target language is registered or when the manually-translated character string of the base language and the explanation prepared in the base language are registered, the content providing apparatus 5 is able to request the registrant of the original term to confirm whether such registered character string and/or explanation prepared in the base language is correct. The term data storage area 221 of the image processing apparatus 2 may also include the column of "E-MAIL ADDRESS OF PERSON WHO REGISTERED TERM".

Note that the information processing system according to this embodiment may also include a plurality of the client terminals 1 in substantially the same manner as the above-described embodiment. In a case where the information processing system includes the plurality of the client terminals 1, the UI unit 211 of the content providing apparatus 5 receives the registrations of new terms from respective ones of the plurality of the client terminals 1. In addition, in the operation described with reference to FIG. 11, when the content providing apparatus 5 acquires, from the plurality of the client terminals 1, the notification of the number of times of UI display together with the information on the term ID and the language, the character string registration unit 212 of the content providing apparatus 5 sums up every number of times of UI display received from the plurality of the client terminal is, to increment the number of times of UI display in the term data storage area 221 based on the sum. With such configuration, the content providing apparatus 5 is able to determine which character string is to be manually translated based on the number of times of the UI display in all of the plurality of the client terminals 1.

The present invention is not limited to the details of the embodiments described above, and various modifications and improvements are possible within the scope of the appended claims.

For example, in the embodiments described above, the machine translation request unit 213 requests the machine translation apparatus 3 to perform the machine translation. Alternatively, the machine translation request unit 213 itself may perform the machine translation.

The operation by each apparatus or terminal constituting the information processing system according to the embodiments described above can be implemented in any convenient form, for example using hardware, software, or a mixture of hardware and software.

For executing a process or processes using software, a program storing a processing sequence installed in a memory of a computer embedded in a dedicated hardware is executed. Alternatively, such program may be installed for execution in a memory of a general-purpose computer that can perform various processes.

The program may be stored in advance in a hard disc or a read only memory (ROM) as a recording medium. Alternatively, the program may be stored temporally or permanently stored in a removable recording medium. Such removable recording medium may be provided as a packaged software. Such removable recording medium may be implemented by various types of a recording medium such as a magnetic disk or a semiconductor memory.

The program may be installed in a computer from the removable recording medium as described above. Alternatively, the program may be download from a website to the computer via a wireless communications network. Alternatively, the program may transferred to the computer via a wired communications network.

The program may be implemented using a cloud server on the Internet. A part of instruction codes of the program may be transferred to the computer for use.

Each process or processes of the operation according to the embodiments described above may be executed by each apparatus or terminal constituting the information processing system according to the embodiments described above sequentially, concurrently, or individually depending on performance of the apparatus or terminal or as needed.

The information processing system according to the embodiments described above may perform the operation according to the embodiments described above when the information processing apparatus that supports different languages translates a character string of a function or a selectable item of a function edited by a user into multiple language. With such configuration and operation, in the information processing system that supports different languages, the character string that is referred to by the user more frequently is manually translated over other character strings.

Each function in the above-described embodiments may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, the network can comprise any conventional terrestrial or wireless communications network, such as the Internet.

What is claimed is:

1. An information processing apparatus comprising:
a memory to store, for each one of a plurality of character strings, display number information indicating a total number of times the character string has been displayed at a user terminal, the user terminal being operated by a user,
a receiver to receive, from the user terminal, information on one of the plurality of character strings that is displayed at the user terminal; and
circuitry to:
update the display number information for the displayed character string, based on the information on the displayed character string that is received by the receiver,
determine whether the displayed character string is to be translated, based on the updated display number information; and
send a request to manually translate the displayed character string, based on determination indicating that the displayed character string is to be translated.

2. The information processing apparatus according to claim 1, wherein the circuitry is configured to determine that the displayed character string is to be translated into a specific language, when the number of times of display that is indicated by the updated display number information exceeds a threshold,
the specific language being determined based on the information on the displayed character string that is received from the user terminal.

3. The information processing apparatus according to claim 2, wherein the circuitry is further configured to
register a character string in the memory,
machine-translate the registered character string into a plurality of different languages to generate a plurality of machine-translated character strings, and
store, in the memory, the plurality of machine-translated character strings in association with the display number information.

4. The information processing apparatus according to claim 3, wherein the circuitry is further configured to store, for each one of the plurality of character strings stored in the memory, status information indicating a status of translation of the character string for each one of the plurality of different languages, and
wherein the status information indicates at least one of 1) a status indicating that the character string is an original character string that is not translated, 2) a status indicating that the character string is machine-translated, and 3) a status indicating that the character string is manually-translated.

5. The information processing apparatus according to claim 3, wherein the circuitry is further configured to
store, in the memory, for each one of the plurality of character strings, an e-mail address of a user who has registered the character string, and acquire the manually-translated character string of the displayed character string, in response to the request to manually translate, and
send the acquired manually-translated character string to the e-mail address stored in association with the displayed character string.

6. The information processing apparatus according to claim 2, wherein the receiver receives the information on the displayed character string, in response to a user operation on the displayed character string that is detected at the user terminal.

7. A system, comprising:
the information processing apparatus of claim 1; and
a user terminal connected to the information processing apparatus through a network and configured to display information,
wherein the displayed character string is selected from the displayed information.

8. The system of claim 7, further comprising:
a translator terminal connected to the information processing apparatus through the network and configured to receive the request to manually translate the character string that is determined to be manually-translated.

9. A non-transitory, machine-readable recording medium storing program code for causing an information processing apparatus to perform a method for processing information, the method comprising:
storing in a memory, for each one of a plurality of character strings, display number information indicating a total number of times the character string has been displayed at a user terminal, the user terminal being operated by a user,
receiving, from the user terminal, information on one of the plurality of character strings that is displayed at the user terminal;
updating the display number information for the displayed character string, based on the information on the displayed character string;
determining whether the displayed character string is to be translated, based on the updated display number information; and
sending a request to manually translate the displayed character string based on determination indicating that the displayed character string is to be translated.

10. A method for processing information, comprising:
storing in a memory, for each one of a plurality of character strings, display number information indicating a total number of times the character string has been displayed at a user terminal, the user terminal being operated by a user,
receiving, from the user terminal, information on one of the plurality of character strings that is displayed at the user terminal;
updating the display number information for the displayed character string, based on the information on the displayed character string;
determining whether the displayed character string is to be translated, based on the updated display number information; and
sending a request to manually translate the displayed character string based on determination indicating that the displayed character string is to be translated.

* * * * *